US012761695B2

(12) United States Patent
Choi et al.

(10) Patent No.: US 12,761,695 B2
(45) Date of Patent: Oct. 13, 2026

(54) ELECTRONIC DEVICE

(71) Applicant: Samsung Display Co., Ltd., Yongin-si (KR)

(72) Inventors: Kyungmin Choi, Yongin-si (KR); Hyochang Kim, Yongin-si (KR); Byeongkyu Park, Yongin-si (KR); Sunhaeng Cho, Yongin-si (KR); Hansun Ryou, Yongin-si (KR); Sungguk An, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 300 days.

(21) Appl. No.: 18/305,176

(22) Filed: Apr. 21, 2023

(65) Prior Publication Data

US 2024/0019905 A1 Jan. 18, 2024

(30) Foreign Application Priority Data

Jul. 14, 2022 (KR) ........................ 10-2022-0087064

(51) Int. Cl.
*G06F 1/16* (2006.01)
*H04M 1/02* (2006.01)

(52) U.S. Cl.
CPC .......... *G06F 1/1656* (2013.01); *G06F 1/1616* (2013.01); *G06F 1/1643* (2013.01); *H04M 1/0222* (2013.01)

(58) Field of Classification Search
CPC .... G06F 1/1656; G06F 1/1616; G06F 1/1643; H04M 1/0222
See application file for complete search history.

(56) References Cited

U.S. PATENT DOCUMENTS 7,201,949 B2 4/2007 Houghtaling et al.
10,516,119 B2 * 12/2019 Lee .................... H10K 59/8731
2012/0213967 A1 * 8/2012 Hosoda ................ G02B 5/0226 428/143
2021/0029841 A1 * 1/2021 Kim .................... H04M 1/0216
2021/0055760 A1 * 2/2021 Lee ........................ G09G 3/035

FOREIGN PATENT DOCUMENTS

JP 2001-53402 A 2/2001
JP 3806550 B2 * 8/2006
KR 10-2006-0113899 A 11/2006
KR 10-1038286 B1 6/2011
KR 10-2017-0080799 A 7/2017
KR 10-1888448 B1 8/2018
KR 102407857 B1 * 6/2022

* cited by examiner

*Primary Examiner* — Imani N Hayman
*Assistant Examiner* — Ross Terry Mularski
(74) *Attorney, Agent, or Firm* — Womble Bond Dickinson (US) LLP

(57) ABSTRACT

An electronic device includes: a display panel including a first non-folding area, a second non-folding area, and a folding area between the first non-folding area and the second non-folding area; a protective film under the display panel; and a support member under the protective film. The protective film includes: a base layer including an upper surface adjacent to the display panel, and a lower surface adjacent to the support member; and an antistatic coating layer on the lower surface of the base layer, and including a coating base material layer, and a plurality of fillers dispersed in the coating base material layer. An average diameter of the plurality of fillers is greater than a thickness of the coating base material layer.

18 Claims, 14 Drawing Sheets

ELECTRONIC DEVICE

CROSS-REFERENCE TO RELATED APPLICATIONS

This application claims priority to and the benefit of Korean Patent Application No. 10-2022-0087064, filed on Jul. 14, 2022, in the Korean Intellectual Property Office, the entire content of which is incorporated by reference herein.

BACKGROUND

1. Field

Aspects of embodiments of the present disclosure relate to an electronic device, and a manufacturing process thereof.

2. Description of Related Art

An electronic device, such as a smart phone, a tablet, a laptop computer, a car navigation system, and a smart television, includes a display device to provide information.

To satisfy a user experience/interface (UX/UI), various kinds of display devices have been developed. From among the display devices, a flexible display device is actively being developed.

A display device includes a display area activated in response to an electrical signal. The display device may sense an input applied from the outside through the display area, and simultaneously display various images to provide information to a user. Recently, as display devices having various shapes have been developed, display areas having various shapes are being implemented.

The above information disclosed in this Background section is for enhancement of understanding of the background of the present disclosure, and therefore, it may contain information that does not constitute prior art.

SUMMARY

One or more embodiments of the present disclosure are directed to an electronic device having improved reliability by preventing or substantially preventing a foreign substance defect during a manufacturing process thereof.

According to one or more embodiments of the present disclosure, an electronic device includes: a display panel including a first non-folding area, a second non-folding area, and a folding area between the first non-folding area and the second non-folding area; a protective film under the display panel; and a support member under the protective film. The protective film includes: a base layer including an upper surface adjacent to the display panel, and a lower surface adjacent to the support member; and an antistatic coating layer on the lower surface of the base layer, and including a coating base material layer, and a plurality of fillers dispersed in the coating base material layer. An average diameter of the plurality of fillers is greater than a thickness of the coating base material layer.

In an embodiment, the thickness of the coating base material layer may be 0.3 micrometers or more, and 1 micrometer or less.

In an embodiment, the average diameter of the plurality of fillers may be 1.5 micrometers or more, and 3 micrometers or less.

In an embodiment, each of the plurality of fillers may include at least one selected from a group consisting of polyethylene, polypropylene, and polystyrene.

In an embodiment, each of the plurality of fillers may further include an acrylic monomer additive.

In an embodiment, the coating base material layer may include a conductive polymer.

In an embodiment, the base layer may include a heat-resistant synthetic resin film.

In an embodiment, the protective film may further include an intermediate layer on at least one of the upper surface or the lower surface of the base layer, and including an additional filling particle.

In an embodiment, some of the plurality of fillers may include an exposed surface that is exposed in a direction toward the support member, and others of the plurality of fillers may be covered by the coating base material layer.

In an embodiment, an area ratio of a portion of the antistatic coating layer including the plurality of fillers with respect to a total area of the antistatic coating layer in a plan view may be 1% or less.

In an embodiment, a content of the plurality of fillers with respect to a total content of the antistatic coating layer may be 1 weight percentage (wt %) or less.

In an embodiment, a friction coefficient of a lower surface of the antistatic coating layer may be 1 or less.

In an embodiment, the electronic device may further include: a window on the display panel; an upper protective film between the window and the display panel; and an anti-reflection layer between the upper protective film and the display panel.

In an embodiment, the electronic device may further include: a barrier layer between the protective film and the support member; a digitizer under the support member; a metal layer under the digitizer; a metal plate under the metal layer; and a heat dissipation layer under the metal plate.

In an embodiment, the support member may further include carbon fiber reinforced plastic or glass fiber reinforced plastic.

In an embodiment, a plurality of openings overlapping with the folding area may be defined in the support member.

In an embodiment, the electronic device may further include: an upper adhesive layer between the display panel and the protective film; and a lower adhesive layer between the protective film and the support member.

According to one or more embodiments of the present disclosure, an electronic device includes: a display panel including a first non-folding area, a second non-folding area, and a folding area between the first non-folding area and the second non-folding area; a protective film under the display panel; and a support member under the protective film. The protective film includes: a base layer; and an antistatic coating layer on one surface of the base layer. The antistatic coating layer includes: a coating base material layer; and a filler dispersed in the coating base material layer. A thickness of the coating base material layer is 0.3 micrometers or more, and 1 micrometer or less, and a diameter of the filler is 1.5 micrometers or more, and 3 micrometers or less.

In an embodiment, the filler may include: a base material including at least one selected from a group consisting of polyethylene, polypropylene, and polystyrene; and an acrylic monomer.

According to one or more embodiments of the present disclosure, an electronic device includes: a display device including a sensing area configured to pass an optical signal through, and a display area adjacent to the sensing area; and an electro-optic module below the display device, and overlapping with the sensing area, the electro-optic module being configured to receive the optical signal. The display device includes: a window defining an upper surface of the display device; a display panel under the window, and including a first non-folding area, a second non-folding area, and a folding area between the first non-folding area and the second non-folding area; and a protective film under the display panel. The protective film includes: a base layer including an upper surface adjacent to the display panel, and a lower surface opposite to the upper surface; and an antistatic coating layer on the lower surface of the base layer, and including a coating base material layer, and first filling particles dispersed in the coating base material layer. A diameter of the first filling particles is greater than a thickness of the coating base material layer.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1A:
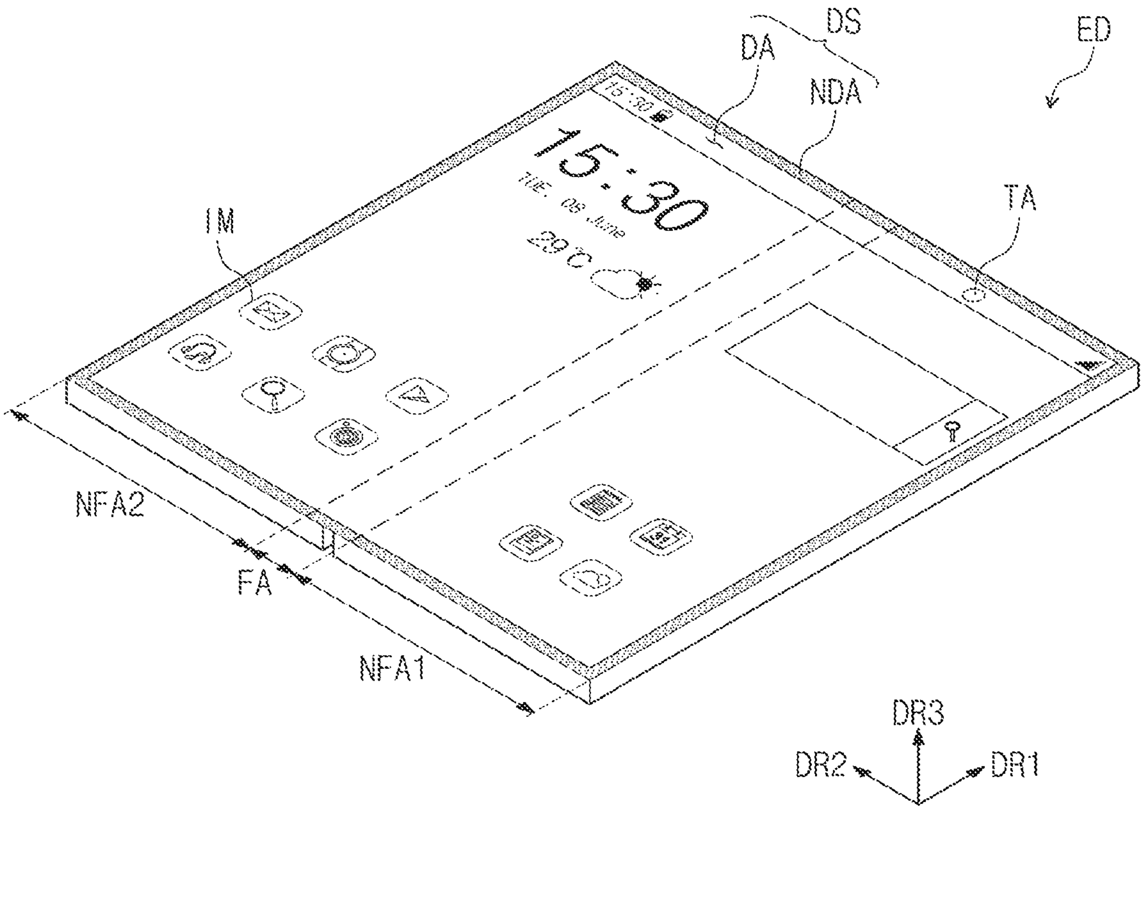
FIGS. 1A-1C are perspective views of an electronic device according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present. Further, the phrase "directly disposed" may mean that there is no layer, film, region, plate or the like between a portion of a layer, film, region, plate or the like and another portion. For example, "directly disposed" may mean that one or more adhesive members are not disposed between two layers or two members.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
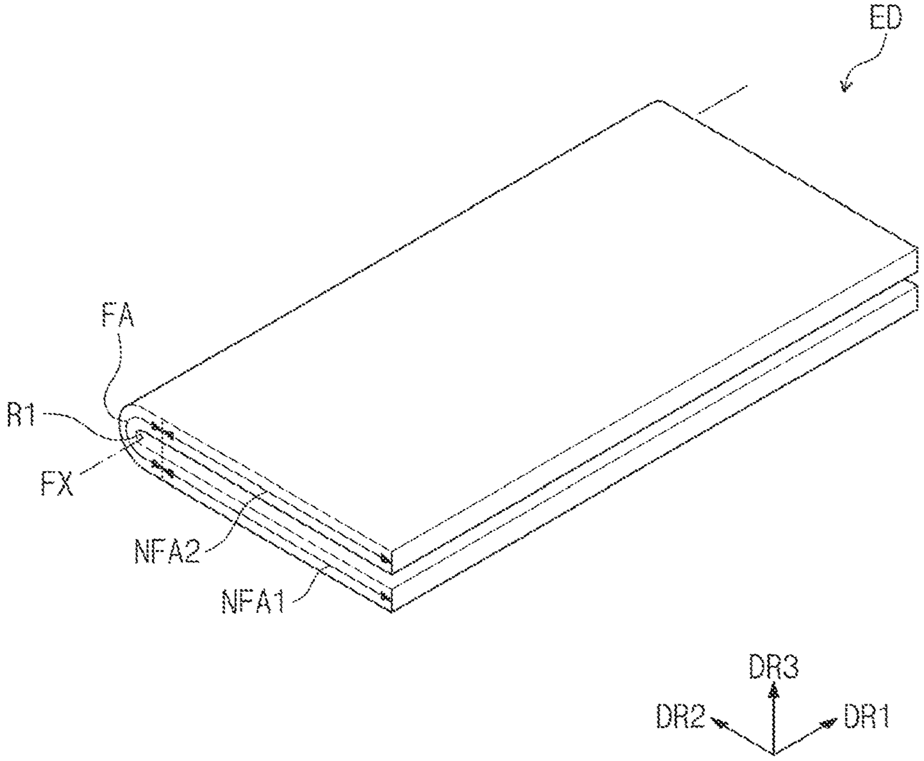
Figure 1C:
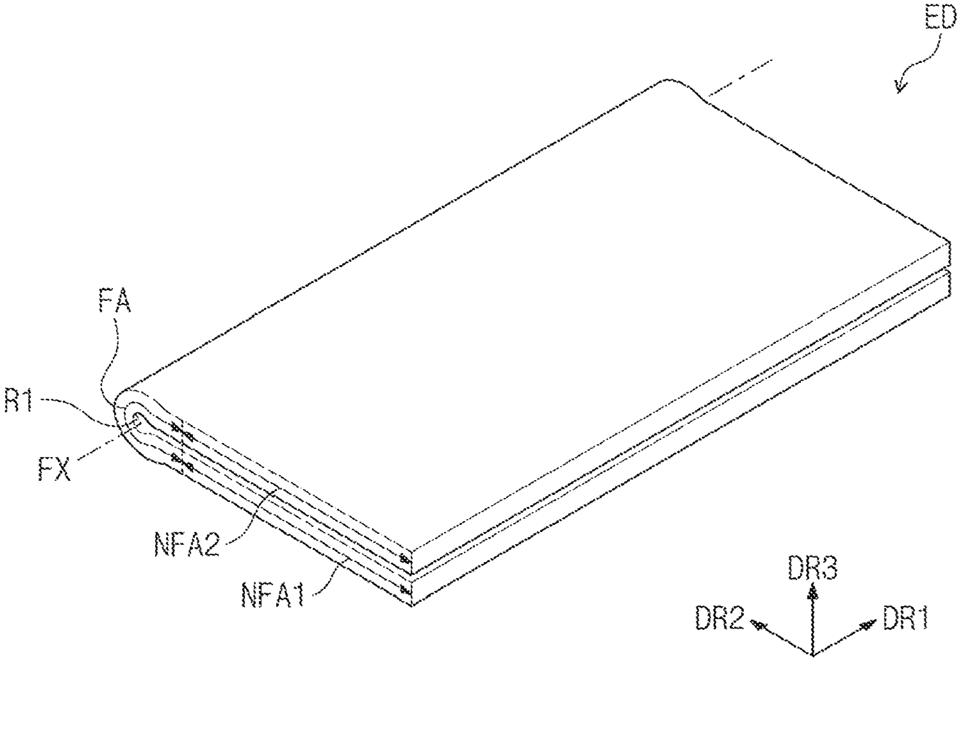

FIGS. 1A through 1C are perspective views of an electronic device ED according to one or more embodiments of the present disclosure. FIG. 1A shows an unfolded state, and FIGS. 1B and 1C show a folded state.

Referring to FIGS. 1A through 1C, an electronic device ED according to an embodiment of the present disclosure, may include a display surface DS defined by a first direction DR1, and a second direction DR2 crossing (e.g., intersecting) the first direction DR1. The electronic device ED may provide an image IM to a user through the display surface DS.

The display surface DS may include a display area DA, and a non-display area NDA around (e.g., adjacent to) the display area DA. The display area DA may display the image IM, and the non-display area NDA may not display the image IM. The non-display area NDA may surround (e.g., around a periphery of) the display area DA. However, the present disclosure is not limited thereto, and a shape of the display area DA and a shape of the non-display area NDA may be variously modified as needed or desired.

The display surface DS may include a sensing area TA. The sensing area TA may be a partial area of the display area DA. The sensing area TA has a higher transmittance than those of other areas of the display area DA. Hereinafter, the other areas of the display area DA, except for the sensing area TA, may be defined as a general display area.

An optical signal, for example, such as visible light or infrared light, may move to the sensing area TA. The electronic device ED may capture an external image through visible light passing via the sensing area TA, or may determine accessibility of an external object through infrared light. Although one sensing area TA is illustrated in FIG. 1A, the present disclosure is not limited thereto, and a plurality of sensing areas TA may be provided.

Hereinafter, a direction that is perpendicular to or substantially perpendicular to a plane defined by the first direction DR1 and the second direction DR2 is defined as a third direction DR3. The third direction DR3 serves as a reference for distinguishing front and rear surfaces of each member from each other. As used in the present specification, the phrases "on a plane" and "in a plan view" may be defined as a state of an object viewed from the third direction DR3. Hereinafter, the first to third directions DR1, DR2, and DR3 refer to the same directions indicated by the first to third directional axes, respectively, as illustrated in the figures.

The electronic device ED may include a folding area FA, and a plurality of non-folding areas NFA1 and NFA2. The non-folding areas NFA1 and NFA2 may include a first non-folding area NFA1 and a second non-folding area NFA2. In the second direction DR2, the folding area FA may be disposed between the first non-folding area NFA1 and the second non-folding area NFA2.

As illustrated in FIG. 1B, the folding area FA may be folded based on a folding axis FX parallel to or substantially parallel to the first direction DR1. The folding area FA has a suitable curvature (e.g., a predetermined curvature) and a curvature radius R1. The first non-folding area NFA1 and the second non-folding areas NFA2 may face each other, and the electronic device ED may be inner-folded, such that the display surface DS is not exposed to the outside.

In an embodiment of the present disclosure, the electronic device ED may be outer-folded, such that the display surface DS is exposed to the outside. In an embodiment of the present disclosure, the electronic device ED may be configured, such that an in-folding operation or an out-folding operation from an unfolding operation may be repeated, but the present disclosure is not limited thereto. In an embodiment of the present disclosure, the electronic device ED may be configured to selectively operate in any one of an unfolding operation, an in-folding operation, and/or an out-folding operation.

As shown in FIG. 1B, a distance between the first non-folding area NFA1 and the second non-folding area NFA2 may be equal to or substantially equal to the curvature radius R1, but the present disclosure is not limited thereto, and as shown in FIG. 1C, a distance between the first non-folding area NFA1 and the second non-folding area NFA2 may be smaller than the curvature radius R1. FIGS. 1B and 1C are views based on the display surface DS, and a housing HM (e.g., refer to FIG. 2A) forming an exterior of the electronic device ED may be in contact with a bottom of a window WM at the first non-folding area NFA1 and the second non-folding area NFA2.

Figure 2A:
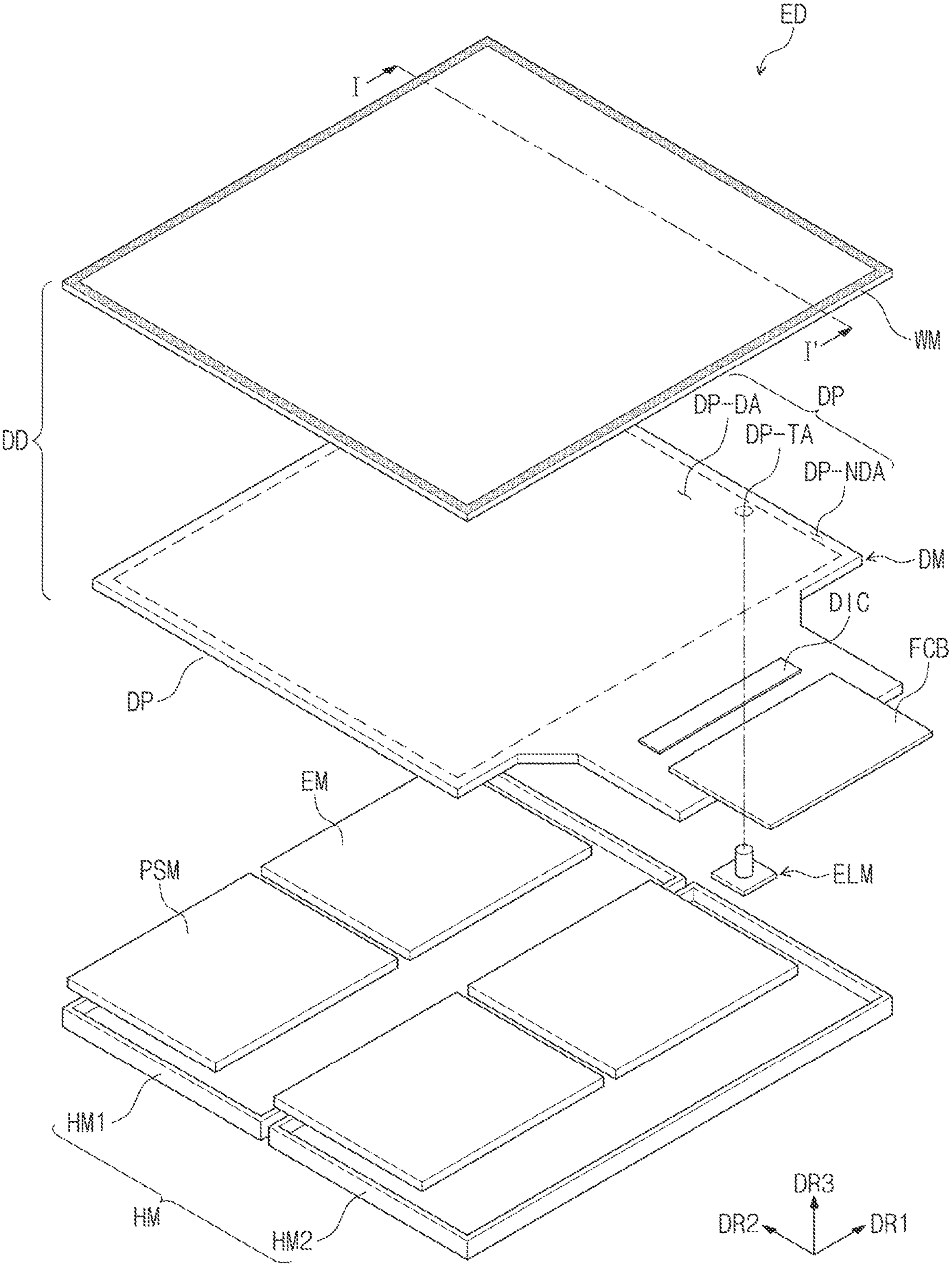
FIG. 2A is an exploded perspective view of an electronic device according to an embodiment of the present disclosure.
Figure 2B:
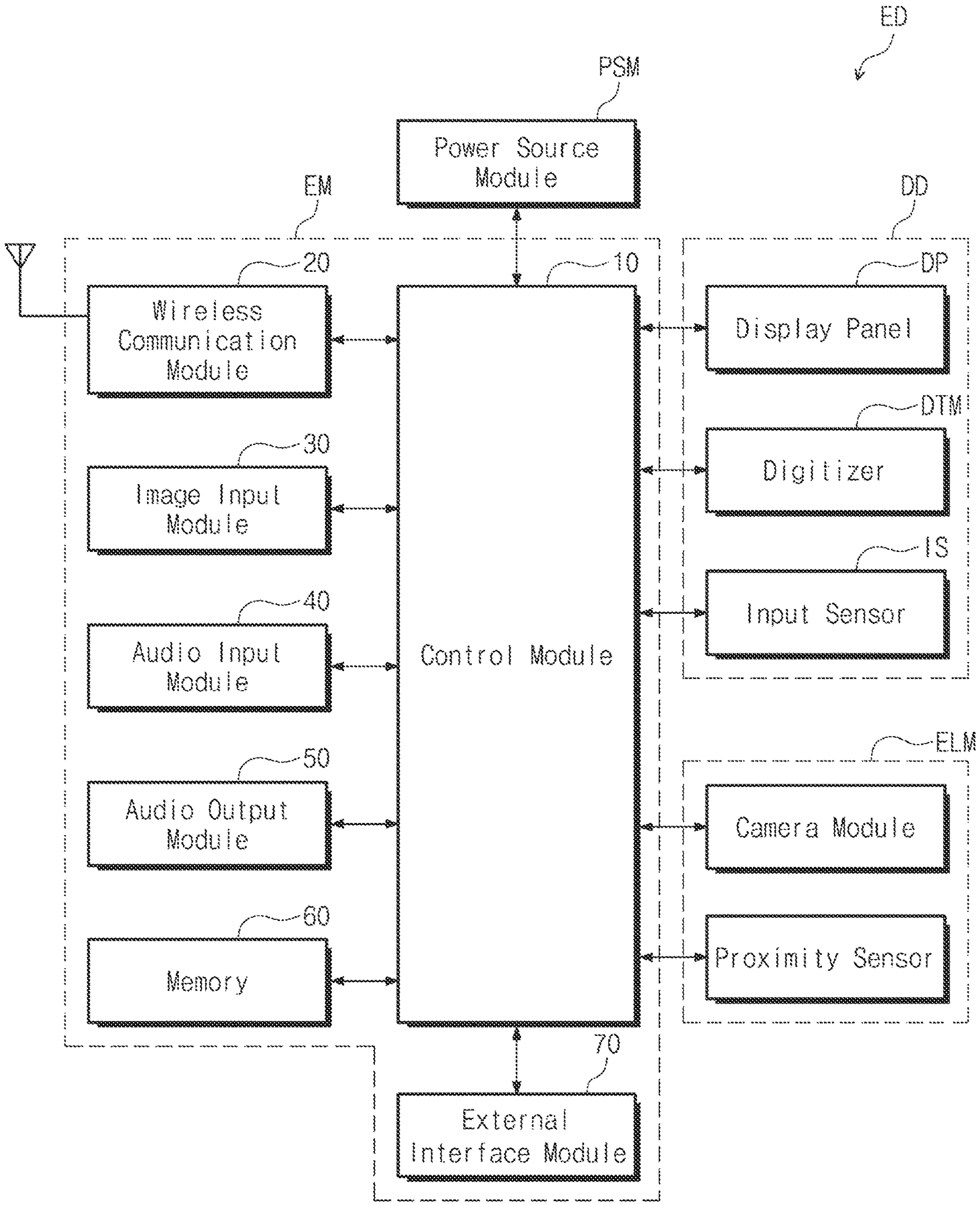
FIG. 2B is a block diagram of an electronic device according to an embodiment of the present disclosure.

FIG. 2A is an exploded perspective view of an electronic device ED according to an embodiment of the present disclosure. FIG. 2B is a block diagram of an electronic device ED according to an embodiment of the present disclosure.

Referring to FIGS. 2A and 2B, the electronic device ED may include a display device DD, an electronic module (e.g., an electronic device, circuit, or board) EM, an electro-optical module (e.g., an electro-optical sensor or device) ELM, a power source module (e.g., a power source) PSM, and a housing HM. The electronic device ED may further include a mechanical structure for controlling a folding operation of the display device DD.

The display device DD generates an image, and senses an external input. The display device DD includes a window WM and a display module (e.g., a display or a touch-display) DM. The window WM provides a front side of the electronic device ED. The window WM will be described in more detail below.

The display module DM may include at least a display panel DP. Although the display panel DP is illustrated from among the stacked structures of the display module DM in FIG. 2A, the display module DM may further include a plurality of components disposed above the display panel DP. The stacked structure of the display module DM will be described in more detail below.

The display panel DP is not particularly limited, and may be, for example, a light emitting display panel, such as an organic light emitting display panel, or a quantum dot light emitting display panel. The display panel DP may be a display panel including a micro light emitting element, such as a micro LED or a nano LED.

The display panel DP includes a display area DP-DA and a non-display area DP-NDA corresponding to the display area DA and the non-display area NDA (e.g., refer to FIG. 1A) of the electronic device ED, respectively. As used in the present specification, the phrase "area/portion corresponds to another area/portion" means that the two areas/portions may overlap with each other, and is not necessarily limited to the same area.

The display panel DP may include a sensing area DP-TA corresponding to the sensing area TA illustrated in FIG. 1A. The sensing area TA may have a lower resolution than that of the display area DP-DA. The sensing area DP-TA will be described in more detail below.

As illustrated in FIG. 2A, a driving chip DIC may be disposed at (e.g., in or on) the non-display area DP-NDA of the display panel DP. A flexible circuit board FCB may be coupled to (e.g., connected to or attached to) the non-display area DP-NDA of the display panel DP. The flexible circuit board FCB may be connected to a main circuit board. The main circuit board may be one electronic component constituting the electronic module EM.

The driving chip DIC may include driving elements, for example, such as a data driving circuit, for driving pixels of the display panel DP. Although FIG. 2A illustrates a structure in which the driving chip DIC is mounted on the display panel DP, the present disclosure is not limited thereto. For example, the driving chip DIC may be mounted on the flexible circuit board FCB.

As shown in FIG. 2B, the display device DD may further include an input sensor IS and a digitizer DTM. The input sensor IS senses a user's input. The capacitive input sensor IS may be disposed above the display panel DP. The digitizer DTM senses an input of a stylus pen. The electromagnetic induction type digitizer DTM may be disposed under the display panel DP.

The electronic module EM may include a control module (e.g., a controller) a wireless communication module (e.g., a wireless communication circuit or device) an image input module (e.g., an image input circuit or device) 30, an audio input module (e.g., an audio input circuit or device) 40, an audio output module (e.g., an audio output circuit or device) 50, memory 60, and an external interface module (e.g., an external interface circuit or device) 70. The electronic module EM may include a main circuit board, and the modules may be mounted on the main circuit board, or electrically connected to the main circuit board through a flexible circuit board. The electronic module EM is electrically connected to the power source module PSM.

Referring to FIG. 2A the electronic module EM may be disposed on each of a first housing HM1 and a second housing HM2. The power source module PSM may be disposed on each of the first housing HM1 and the second housing HM2. In some embodiments, the electronic module EM disposed on the first housing HM1 and the electronic module EM disposed on the second housing HM2 may be electrically connected to each other through a flexible circuit board.

The control module 10 controls an overall operation of the electronic device ED. For example, the control module 10 activates or deactivates the display device DD depending on a user input. The control module 10 may control the image input module 30, the audio input module 40, and the audio output module 50, depending on the user input. The control module 10 may include at least one microprocessor.

The wireless communication module 20 may transmit/receive a wireless signal to/from another terminal using a Bluetooth or Wi-Fi line. The wireless communication module 20 may transmit/receive a voice signal using a general communication line. The wireless communication module 20 may include a plurality of antenna modules (e.g., a plurality of antennas).

The image input module 30 processes an image signal, and converts the image signal into image data capable of being displayed on the display device DD. The audio input module 40 receives an external audio signal through a microphone in a recording mode or a voice recognition mode, and converts the external audio signal into electrical voice data. The audio output module 50 converts the audio data received from the wireless communication module 20 or the audio data stored in the memory 60, and outputs the audio data to the outside.

The external interface module 70 serves as an interface connected to an external charger, a wired/wireless data port, or a card socket (e.g., a memory card, a SIM/UIM card, and/or the like).

The power source module PSM supplies power used for the overall operation of the electronic device ED. The power source module PSM may include a battery (e.g., a conventional battery element).

The electro-optical module ELM may be an electronic component that outputs and/or receives an optical signal. The electro-optical module ELM may include a camera module (e.g., a camera) and/or a proximity sensor. The camera module captures an external image through the sensing area DP-TA.

The housing HM illustrated in FIG. 2A is coupled to (e.g., connected to or attached to) the display device DD, and more specifically, to the window WM, to accommodate the other modules. The housing HM is illustrated as including the first and second housings HM1 and HM2 that are separated from each other, but the present disclosure is not limited thereto. The electronic device ED may further include a hinge structure for connecting the first and second housings HM1 and HM2 to each other.

Figure 3A:
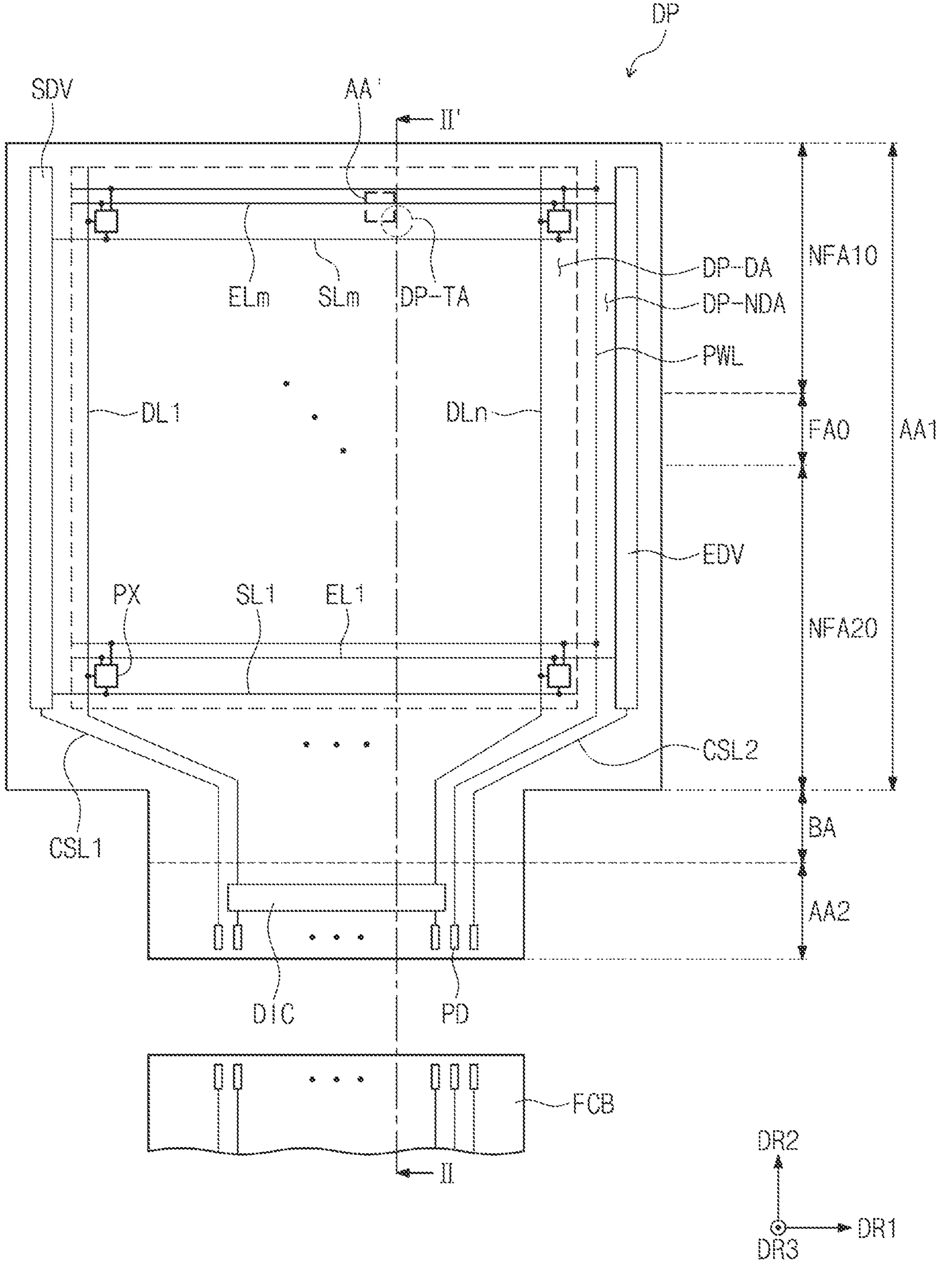
FIG. 3A is a plan view of a display panel according to an embodiment of the present disclosure.
Figure 3B:
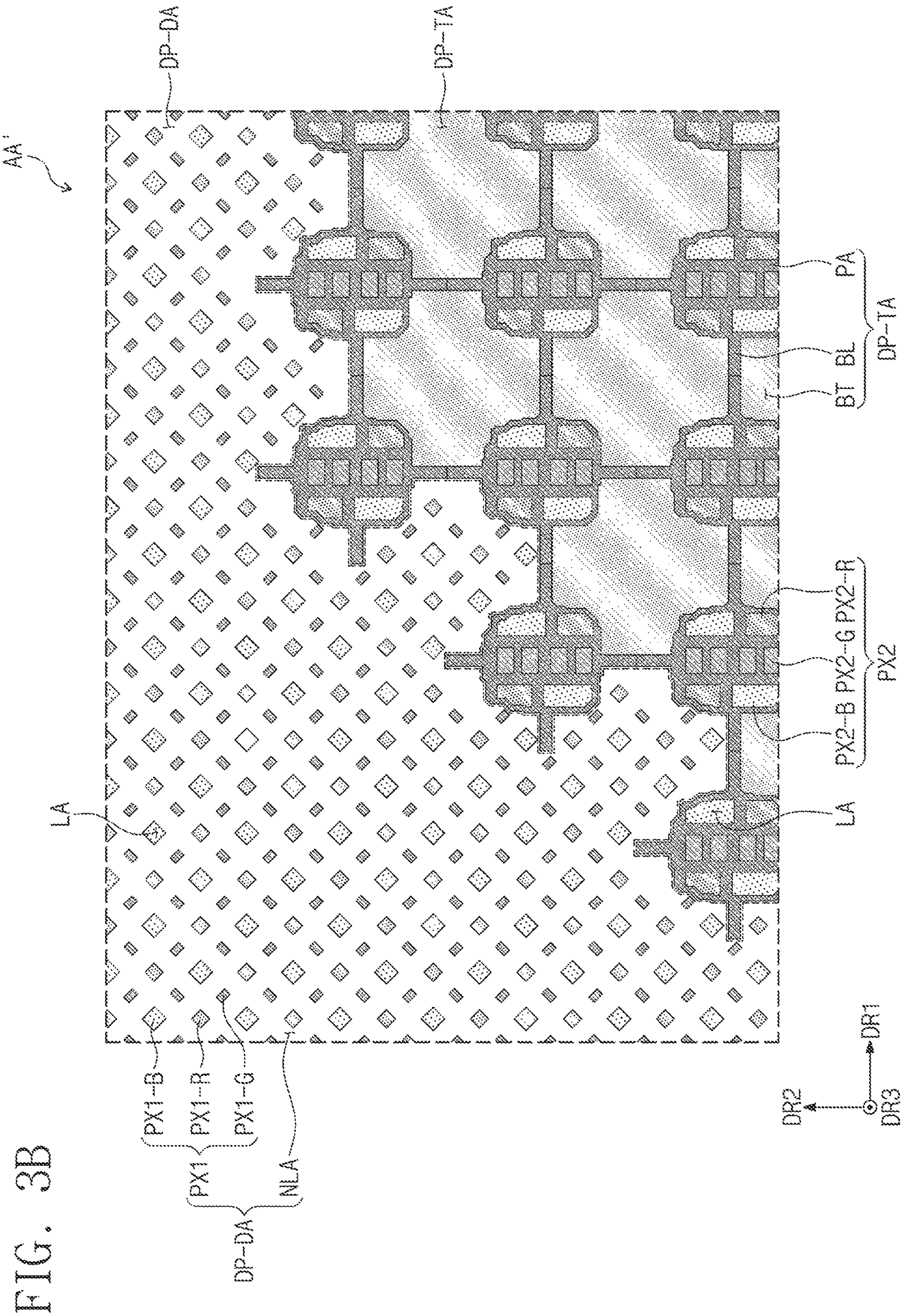
FIG. 3B is an enlarged plan view of a portion of a display panel according to an embodiment of the present disclosure.

FIG. 3A is a plan view of a display panel DP according to an embodiment of the present disclosure. FIG. 3B is an enlarged plan view of a portion of the display panel DP according to an embodiment of the present disclosure. FIG. 3B shows an enlarged region corresponding to the region AA' of FIG. 3A.

Referring to FIG. 3A, the display panel DP may include a display area DP-DA, and a non-display area DP-NDA around (e.g., adjacent to) the display area DP-DA. The display area DP-DA and the non-display area DP-NDA are divided from one another by the presence of a pixel PX. The pixel PX is disposed at (e.g., in or on) the display area DP-DA. A scan driver SDV, a data driver, and an emission driver EDV may be disposed at (e.g., in or on) the non-display area DP-NDA. The data driver may be a partial circuit configured in the driving chip DIC illustrated in FIG. 3A.

The display panel DP includes a first area AA1, a second area AA2, and a bending area BA divided from each other in the second direction DR2. The second area AA2 and the bending area BA may be a partial area of the non-display area DP-NDA. The bending area BA is disposed between the first area AA1 and the second area AA2.

The first area AA1 corresponds to the display surface DS illustrated in FIG. 1A. The first area AA1 may include a first non-folding area NFA10, a second non-folding area NFA20, and a folding area FAO. The first non-folding area NFA10, the second non-folding area NFA20, and the folding area FAO correspond to the first non-folding area NFA1, the second non-folding area NFA2, and the folding area FA, respectively, illustrated in FIGS. 1A through 1C.

A length of the bending area BA and the second area AA2 in the first direction DR1 may be smaller than a length of the first area AA1. When a length in a bending axis direction is shorter, it may be bent more easily.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, a power line PWL, and a plurality of pads PD. Here, "m" and "n" are natural numbers. The pixels PX may be connected to the scan lines SL1 to SLm, the data lines DL1 to DLn, and the emission lines EL1 to ELm.

The scan lines SL1 to SLm may extend in the first direction DR1, and may be connected to the scan driver SDV. The data lines DL1 to DLn may extend in the second direction DR2, and may be connected to the driving chip DIC via the bending area BA. The emission lines EL1 to ELm may extend in the first direction DR1 to be connected to the emission driver EDV.

The power line PWL may include a portion extending in the second direction DR2, and a portion extending in the first direction DR1. The portion extending in the first direction DR1 and the portion extending in the second direction DR2 may be disposed at (e.g., in or on) different layers from each other. The portion of the power line PWL extending in the second direction DR2 may extend to the second area AA2 via the bending area BA. The power line PWL may provide a first voltage to the pixels PX.

The first control line CSL1 may be connected to the scan driver SDV, and may extend toward a lower end of the second area AA2 via the bending area BA. The second control line CSL2 may be connected to the light emission driver EDV, and may extend toward the lower end of the second area AA2 via the bending area BA.

On a plane (e.g., in a plan view), the pads PD may be disposed adjacent to the lower end of the second area AA2. The driving chip DIC, the power line PWL, the first control line CSL1, and the second control line CSL2 may be connected to the pads PD. A flexible circuit board FCB may be electrically connected to the pads PD through an anisotropic conductive adhesive layer.

Referring to FIG. 3B, the sensing area DP-TA may have a higher light transmittance and lower resolution than those of the display area DP-DA. The light transmittance and the resolution are measured within a reference area. The sensing area DP-TA has a smaller occupancy ratio of a light blocking structure in the reference area than that of the display area DP-DA. The light blocking structure may include a conductive pattern of a circuit layer, an electrode of a light emitting element, and a light blocking pattern, which will be described in more detail below. The sensing area DP-TA may be an area in which the above-described electro-optic module ELM (e.g., refer to FIG. 2A) overlaps therewith.

The sensing area DP-TA has a lower resolution in the reference area than that of the display area DP-DA. In the sensing area DP-TA, a smaller number of pixels are disposed in the reference area (e.g., the same sized area) than that of the display area DP-DA.

As illustrated in FIG. 3B, a first pixel PX1 may be disposed at (e.g., in or on) the display area DP-DA, and a second pixel PX2 may be disposed at (e.g., in or on) the sensing area DP-TA. The first pixel PX1 and the second pixel PX2 may have different emission areas from each other based on areas of the same colored pixels. The first pixel PX1 and the second pixel PX2 may have different arrangements from each other.

In FIG. 3B, emission areas LA of the first pixel PX1 and the second pixel PX2 are illustrated as representative of the first pixel PX1 and the second pixel PX2. Each of the light emission areas LA may be defined as an area in which an anode of a light emitting element is exposed from a pixel defining layer. A non-emission area NLA is disposed between the emission areas LA at (e.g., in or on) the display area DP-DA.

The first pixel PX1 may include a first color pixel PX1-R, a second color pixel PX1-G, and a third color pixel PX1-B. The second pixel PX2 may include a first color pixel PX2-R, a second color pixel PX2-G, and a third color pixel PX2-B. Each of the first pixel PX1 and the second pixel PX2 may include a red pixel, a green pixel, and a blue pixel.

The sensing area DP-TA may include a pixel area PA, a wiring area BL, and a transmission area BT. The second pixel PX2 is disposed in the pixel area PA. FIG. 3B illustrates that two first color pixels PX2-R, four second color pixels PX2-G, and two third color pixels PX2-B are disposed in one pixel area PA, but the present disclosure is not limited thereto.

A conductive pattern, a signal line, or a light blocking pattern related to the second pixel PX2 is disposed in the pixel area PA and the wiring area BL. The light blocking pattern may be a metal pattern, and may overlap with or substantially overlap with the pixel area PA and the wiring area BL. The pixel area PA and the wiring area BL may be non-transmission areas.

The transmission area BT is an area through which an optical signal passes or substantially passes. The second pixel PX2 may not be disposed in the transmission area BT, and thus, the conductive pattern, the signal line, or the light blocking pattern may be disposed for the second pixel PX2 at the other areas. Accordingly, the transmission area BT increases the light transmittance of the sensing area DP-TA.

Figure 4:
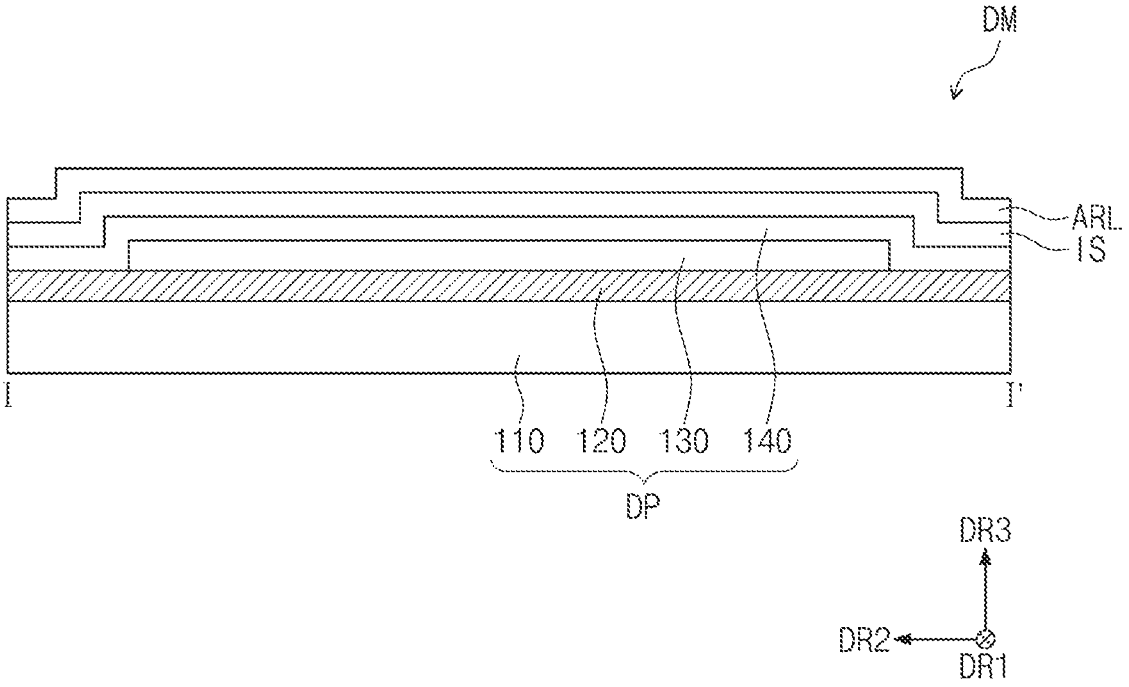
FIG. 4 is a cross-sectional view of a display module according to an embodiment of the present disclosure.

FIG. 4 is a cross-sectional view of a display module DM according to an embodiment.

Referring to FIG. 4, the display module DM may include a display panel DP, an input sensor IS, and an anti-reflection layer ARL. The display panel DP may include a base layer 110, a circuit layer 120, a light emitting element layer 130, and an encapsulation layer 140.

The base layer 110 may provide a base surface on which the circuit layer 120 is disposed. The base layer 110 may be a flexible substrate capable of bending, folding, or rolling. The base layer 110 may be a glass substrate, a metal substrate, or a polymer substrate. However, the present disclosure is not limited thereto, and the base layer 110 may be an inorganic layer, an organic layer, or a composite material layer.

The base layer 110 may have a multilayered structure. For example, the base layer 110 may include a first synthetic resin layer, a multi-layered or single-layer inorganic layer, and a second synthetic resin layer disposed on the multi-layered or single-layer inorganic layer. Each of the first and second synthetic resin layers may include a polyimide-based resin, but is not particularly limited thereto.

The circuit layer 120 may be disposed on the base layer 110. The circuit layer 120 may include an insulating layer, a semiconductor pattern, a conductive pattern, and a signal line.

The light emitting element layer 130 may be disposed on the circuit layer 120. The light emitting element layer 130 may include a light emitting element. For example, the light emitting element may include an organic light emitting material, an inorganic light emitting material, an organic-inorganic light emitting material, a quantum dot, a quantum rod, a micro LED, or a nano LED.

The encapsulation layer 140 may be disposed on the light emitting element layer 130. The encapsulation layer 140 may protect the light emitting element layer 130 from foreign substances, such as moisture, oxygen, and dust particles. The encapsulation layer 140 may include at least one inorganic layer. The encapsulation layer 140 may include a stacked structure of an inorganic layer/organic layer/inorganic layer.

The input sensor IS may be directly disposed on the display panel DP. The display panel DP and the input sensor IS may be formed through a continuous process. Here, "directly disposed" may mean that another component is not disposed between the input sensor IS and the display panel DP. In other words, a separate adhesive layer may not be disposed between the input sensor IS and the display panel DP.

The anti-reflection layer ARL may be directly disposed on the input sensor IS. The anti-reflection layer ARL may reduce a reflectance of external light incident from the outside of the display device DD. The anti-reflection layer ARL may include color filters. The color filters may have a suitable arrangement (e.g., a predetermined arrangement). For example, the color filters may be arranged in consideration of emission colors of the pixels included in the display panel DP. In addition, the anti-reflection layer 300 may further include a black matrix adjacent to the color filters.

In an embodiment of the present disclosure, positions of the input sensor IS and the anti-reflection layer ARL may be interchanged. In an embodiment of the present disclosure, the anti-reflection layer ARL may be replaced with a polarizing film. The polarizing film may be coupled to (e.g., connected to or attached to) the input sensor IS through an adhesive layer.

Figure 5A:
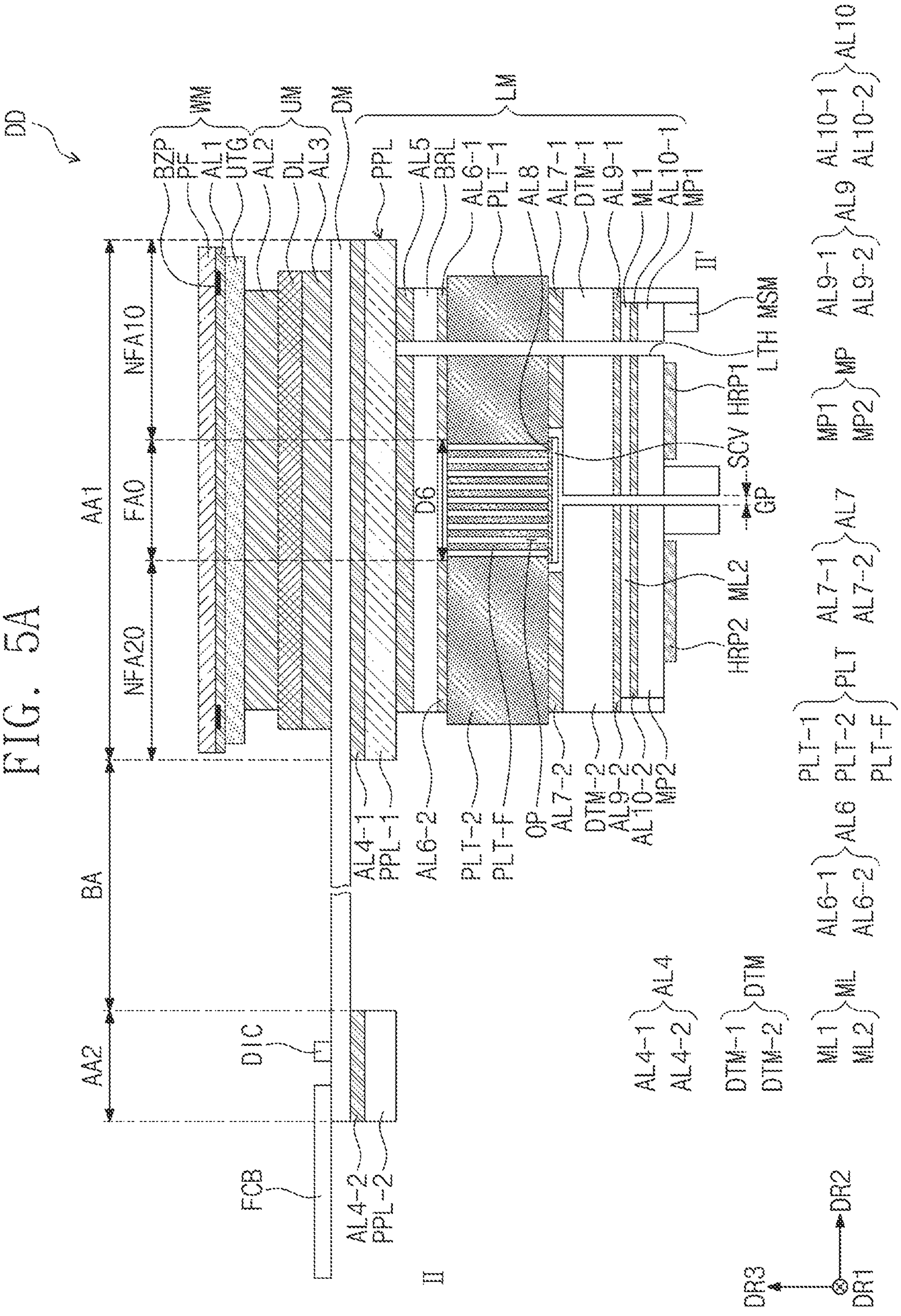
FIG. 5A is a cross-sectional view of a display device according to an embodiment of the present disclosure.
Figure 5B:
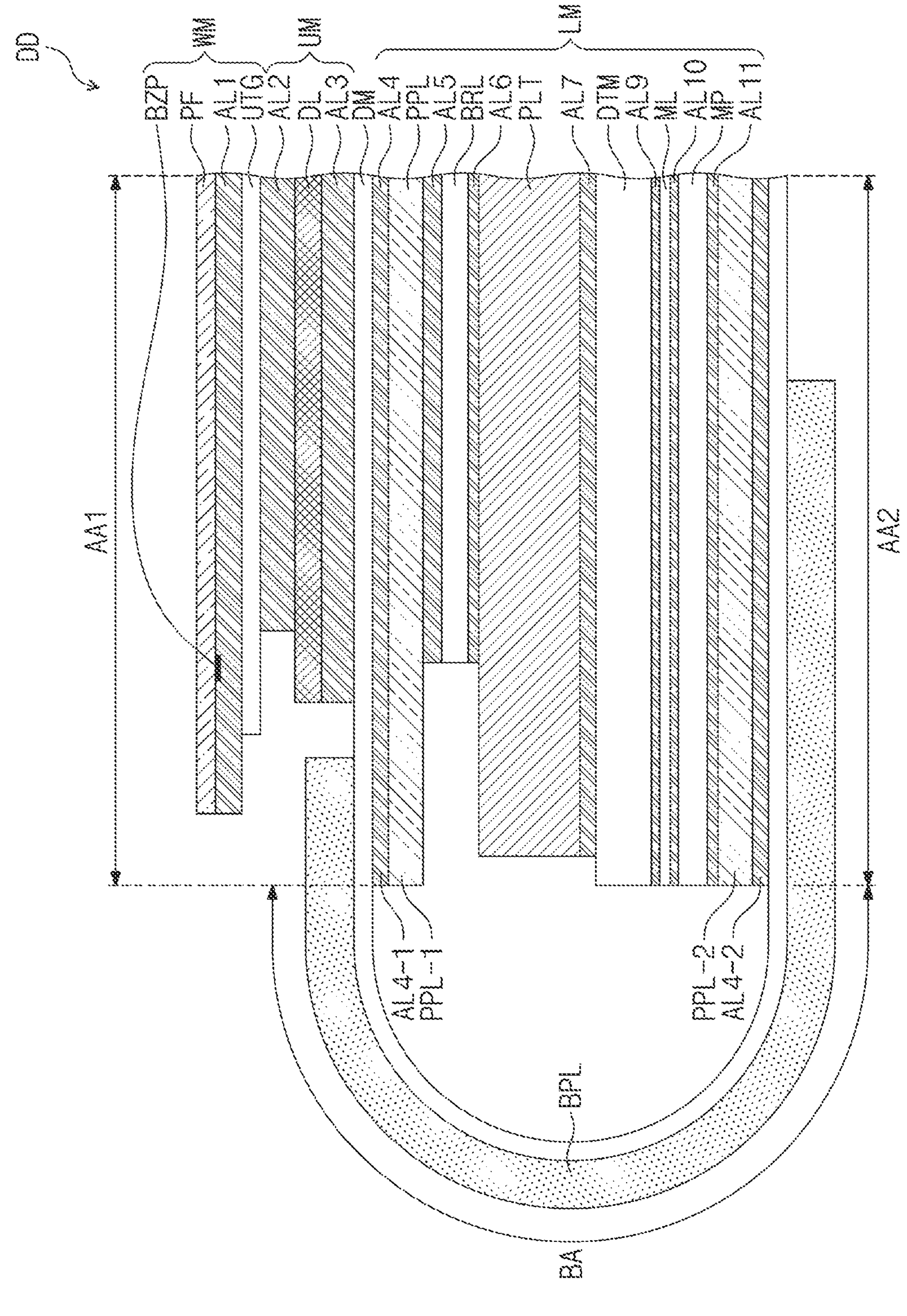
FIG. 5B is a cross-sectional view of a display device according to an embodiment of the present disclosure.
Figure 5C:
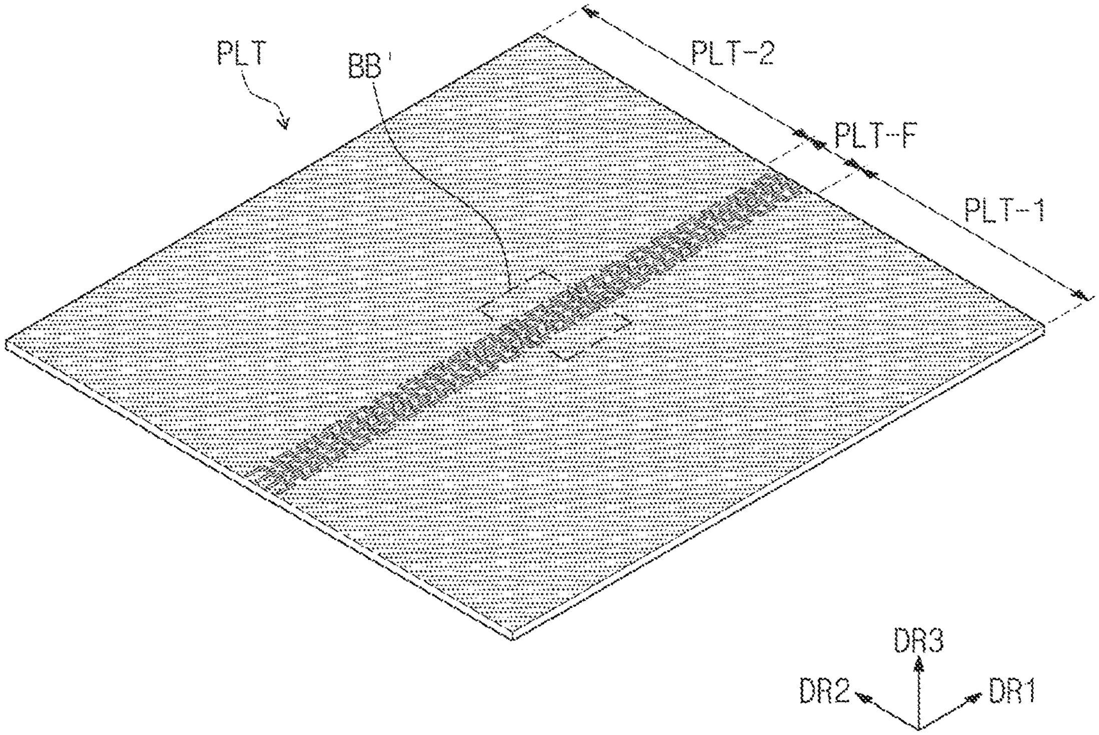
FIG. 5C is a perspective view of a support member according to an embodiment of the present disclosure.
Figure 5D:
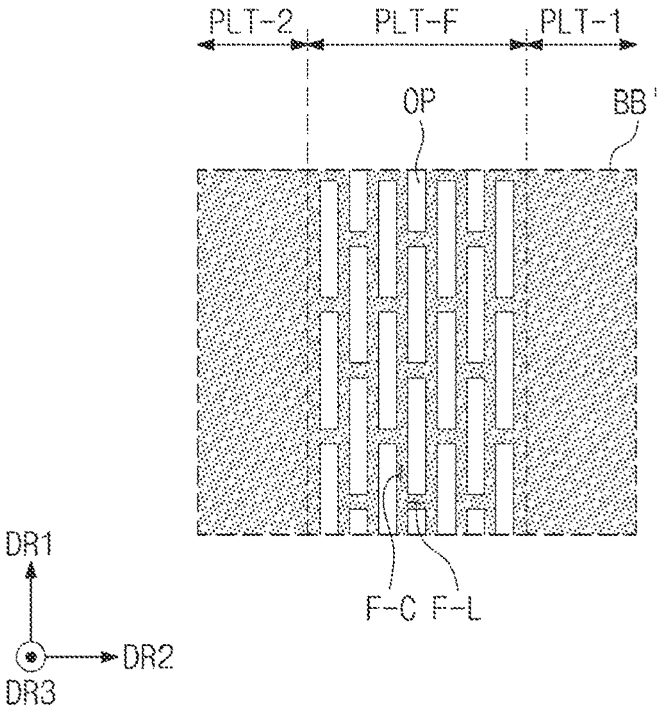
FIG. 5D is a plan view illustrating a portion of a support member according to an embodiment of the present disclosure.

FIG. 5A is a cross-sectional view of a display device DD according to an embodiment of the present disclosure. FIG. 5B is a cross-sectional view of a display device DD according to an embodiment of the present disclosure. FIG. 5C is a perspective view of a support member PLT according to an embodiment of the present disclosure. FIG. 5D is a plan view illustrating a portion of the support member PLT according to an embodiment of the present disclosure. FIG. 5D is an enlarged view of the region BB' shown in FIG. 5C.

FIG. 5A illustrates an unfolded state, in which the display module DM is not bent. FIG. 5B illustrates a folded state, in which the bending area BA (e.g., refer to FIG. 3A) of the display module DM is bent. In FIGS. 5A and 5B, areas dividing the display module DM are illustrated based on the display panel DP illustrated in FIG. 3A.

Referring to FIGS. 5A and 5B, the display device DD includes a window WM, an upper member UM, the display module DM, and a lower member LM. The upper member UM refers to a component disposed between the window WM and the display module DM, and the lower member LM refers to a component disposed below (e.g., underneath) the display module DM.

The window WM may include a thin glass substrate UTG, a window protective layer PF disposed on the thin glass substrate UTG, and a bezel pattern BZP disposed on a lower surface of the window protective layer PF. In the present embodiment, the window protective layer PF may include a synthetic resin film. The window WM may include an adhesive layer AL1 (hereinafter, referred to as a first adhesive layer) coupling (e.g., connecting or attaching) the window protective layer PF and the thin glass substrate UTG to each other.

The bezel pattern BZP overlaps with the non-display area NDA illustrated in FIG. 1A. The bezel pattern BZP may be disposed on one surface of the thin glass substrate UTG, or one surface of the window protective layer PF. FIG. 5B illustrates that the bezel pattern BZP is disposed on the lower surface of the window protective layer PF as an example. However, the present disclosure is not limited thereto, and the bezel pattern BZP may be disposed on an upper surface of the window protective layer PF. The bezel pattern BZP may be a colored light blocking layer, and may be formed, for example, by a coating method. The bezel pattern BZP may include a base material, and a dye or pigment mixed with the base material.

A thickness of the thin glass substrate UTG may be about 15 micrometers to about 45 micrometers. The thickness of the thin glass substrate UTG may be, for example, 30 micrometers. The thin glass substrate UTG may be a chemically strengthened glass. The thin glass substrate UTG may minimize or reduce the occurrence of wrinkles when folding and unfolding are repeated.

A thickness of the window protective layer PF may be about 50 micrometers to about 80 micrometers. The thickness of the window protective layer PF may be, for example, 70 micrometers. The synthetic resin film of the window protective layer PF may include polyimide, polycarbonate, polyamide, triacetylcellulose, polymethylmethacrylate, polyethylene terephthalate, or polyethylene terephthalate. In some embodiments, at least one of a hard coating layer, an anti-fingerprint layer, or an anti-reflection layer may be disposed on the upper surface of the window protective layer PF.

The first adhesive layer AL1 may be a pressure sensitive adhesive film PSA, or an optically clear adhesive OCA. Adhesive layers described in more detail below may also include the same or substantially the same adhesive as that of the first adhesive layer AL1.

The first adhesive layer AL1 may be separated from the thin glass substrate UTG as needed or desired. Strength of the window protective layer PF may be lower than that of the thin glass substrate UTG, and thus, scratches may occur thereon relatively easily. After the first adhesive layer AL1 and the window protective layer PF are separated from each other, a new window protective layer PF may be attached to the thin glass substrate UTG. A thickness of the first adhesive layer AL1 may be, for example, about 20 micrometers to about 50 micrometers.

On a plane (e.g., in a plan view), an edge of the thin glass substrate UTG may not overlap with the bezel pattern BZP. Thus, the edge of the thin glass substrate UTG may be exposed from the bezel pattern BZP, and a fine crack that may be generated at the edge of the thin glass substrate UTG may be inspected through an inspection apparatus.

The upper member UM includes an upper film DL. The upper film DL may include a synthetic resin film. The synthetic resin film may include polyimide, polycarbonate, polyamide, triacetylcellulose, polymethylmethacrylate, or polyethylene terephthalate.

The upper film DL may absorb an external shock applied to a front surface of the display device DD. The display module DM may include the anti-reflection layer ARL described above with reference to FIG. 4, which may replace a polarizing film, thereby, reducing a front impact strength of the display device DD. The upper film DL may compensate for the reduced impact strength by applying the anti-reflection layer ARL. In an embodiment of the present disclosure, the upper film DL may be omitted as needed or desired. A thickness of the upper film DL may be about 10 micrometers to about 40 micrometers. The thickness of the upper film DL may be, for example, 23 micrometers.

The upper member UM may include a second adhesive layer AL2 coupling (e.g., connecting or attaching) the upper film DL and the window WM to each other, and a third adhesive layer AL3 coupling (e.g., connecting or attaching) the upper film DL and the display module DM to each other. A thickness of the second adhesive layer AL2 may be about 50 micrometers to about 100 micrometers. The thickness of the second adhesive layer AL2 may be, for example, 75 micrometers. A thickness of the third adhesive layer AL3 may be about 30 micrometers to about 70 micrometers.

The lower member LM includes a protective film PPL, a barrier layer BRL, a support member PLT, a cover layer SCV, a digitizer DTM, a metal layer ML, a metal plate MP, a heat dissipation layer HRP1 and HRP2, and fourth to tenth adhesive layers AL4 to AL10. The fourth to tenth adhesive layers AL2 to AL10 may include a suitable adhesive, such as a pressure sensitive adhesive or an optically transparent adhesive. In an embodiment of the present disclosure, some of the above-described components and layers may be omitted as needed or desired. For example, the metal plate MP or the heat dissipation layer HRP1 and HRP2, and the adhesive layer related thereto, may be omitted as needed or desired.

The protective film PPL is disposed below (e.g., underneath) the display module DM. The protective film PPL may protect a lower portion of the display module DM. The protective film PPL may include a flexible synthetic resin film. The flexible synthetic resin film included in the protective film PPL may be a heat-resistant synthetic resin film. The protective film PPL may include, for example, heat-resistant polyethylene terephthalate. However, the present disclosure is not limited thereto, and the protective film PPL may include a heat-resistant synthetic resin material, such as polyamideimide, polyetheretherketone, or polyphenylene sulfide.

In an embodiment of the present disclosure, the protective film PPL may not be disposed at (e.g., in or on) the bending area BA. The protective film PPL may include a first protective film PPL-1 protecting the first area AA1 of the display panel DP, and a second protective film PPL-2 protecting the second area AA2 (e.g., refer to FIG. 3A).

The fourth adhesive layer AL4 couples (e.g., connects or attaches) the protective film PPL and the display panel DP to each other. The fourth adhesive layer AL4 may include a first portion AL4-1 corresponding to the first protective film PPL-1, and a second portion AL4-2 corresponding to the second protective film PPL-2. The fourth adhesive layer AL4 may be referred to as an upper adhesive layer. A thickness of the fourth adhesive layer AL4 may be about 15 micrometers to about 35 micrometers. For example, the thickness of the fourth adhesive layer AL4 may be 25 micrometers.

As shown in FIG. 5B, when the bending area BA is bent, the second protective film PPL-2 and the second area AA2 may be disposed below (e.g., underneath) the first area AA1 and the first protective film PPL-1. As the protective film PPL is not disposed at (e.g., in or on) the bending area BA, the bending area BA may be more easily bent. The second protective film PPL-2 may be attached under the metal plate MP through an additional adhesive layer AL11. In an embodiment, the additional adhesive layer AL11 may be omitted as needed or desired.

As shown in FIG. 5B, the bending area BA has a suitable curvature (e.g., a predetermined curvature) and a curvature radius. The curvature radius may be about 0.1 mm to about 0.5 mm. A bending protective layer BPL is disposed at least at (e.g., in or on) the bending area BA. The bending protective layer BPL may overlap with the bending area BA, the first area AA1, and the second area AA2. The bending protective layer BPL may be disposed on a portion of the first area AA1 and a portion of the second area AA2.

The bending protective layer BPL may be bent with the bending area BA. The bending protective layer BPL protects the bending area BA from external impacts, and controls a neutral plane of the bending area BA. The bending protective layer BPL controls stress of the bending area BA, such that the neutral plane is close to signal lines disposed at (e.g., in or on) the bending area BA.

As illustrated in FIGS. 5A and 5B, the fifth adhesive layer AL5 couples (e.g., connects or attaches) the protective film PPL and the barrier layer BRL to each other. The barrier layer BRL may be disposed under the protective film PPL. The barrier layer BRL may increase a resistance to a compressive force caused by external pressing. Accordingly, the barrier layer BRL may serve to prevent or substantially prevent deformation of the display panel DP. The barrier layer BRL may include a flexible plastic material, such as polyimide or polyethylene terephthalate. Also, the barrier layer BRL may be a colored film having low light transmittance. The barrier layer BRL may absorb light incident from the outside. For example, the barrier layer BRL may be a black synthetic resin film. When the display device DD is viewed from an upper side of the window protective layer PF, components disposed under the barrier layer BRL may not be viewed. The barrier layer BRL may have a thickness of about 30 micrometers to about 80 micrometers.

The sixth adhesive layer AL6 couples (e.g., connects or attaches) the barrier layer BRL and the support member PLT to each other. The sixth adhesive layer AL6 may include a first portion AL6-1 and a second portion AL6-2 that are spaced apart from each other. A distance D6 or an interval between the first portion AL6-1 and the second portion AL6-2 corresponds to a width of the folding area FAO, and is greater than that of a gap GP described in more detail below. The distance D6 between the first portion AL6-1 and the second portion AL6-2 may be about 7 mm to about 15 mm, for example, such as about 9 mm to about 13 mm.

In the present embodiment, the first portion AL6-1 and the second portion AL6-2 are defined as different portions of one adhesive layer, but the present disclosure is not limited thereto. When the first portion AL6-1 is defined as one adhesive layer (e.g., the first adhesive layer or the second adhesive layer), and the second portion AL6-2 is defined as another adhesive layer (e.g., the second adhesive layer or the third adhesive layer). All of the above definitions may be applied not only to the sixth adhesive layer AL6 but also to the adhesive layers including two portions from among the adhesive layers described in more detail below.

The fifth adhesive layer AL5 and the sixth adhesive layer AL6 may be referred to as a lower adhesive layer. Each of the fifth and sixth adhesive layers AL5 and AL6 may have a thickness of about 15 micrometers to about 35 micrometers.

The support member PLT is disposed below (e.g., underneath) the barrier layer BRL. The support member PLT supports the components and layers disposed on an upper side of the support member PLT, and maintains or substantially maintains an unfolded state and/or a folded state of the display device DD. The support member PLT has greater strength than that of the barrier layer BRL. The support member PLT includes at least a first support portion PLT-1 corresponding to the first non-folding area NFA10, and a second support portion PLT-2 corresponding to the second non-folding area NFA20. The first support portion PLT-1 and the second support portion PLT-2 are spaced apart from each other in the second direction DR2. A thickness of the support member PLT may be about 150 micrometers to about 200 micrometers.

In the present embodiment, the support member PLT may include a folding portion PLT-F, which corresponds to the folding area FAO, that is disposed between the first support portion PLT-1 and the second support portion PLT-2. The folding portion PLT-F includes a plurality of openings OP. The plurality of openings OP may be suitably arranged, such that the folding area FAO has a lattice shape on a plane (e.g., in a plan view). The first supporting portion PLT-1, the second supporting portion PLT-2, and the folding portion PLT-F may have an integral shape.

The folding portion PLT-F may prevent or substantially prevent foreign substances from penetrating into a central area of the barrier layer BRL that is opened (e.g., that is exposed) from the first support portion PLT-1 and the second support portion PLT-2 during the folding operation illustrated in FIGS. 1B and 1C. Flexibility of the folding portion PLT-F is improved by the plurality of openings OP. In addition, the sixth adhesive layer AL6 may not be disposed on the folding portion PLT-F, and thus, the flexibility of the support member PLT may be improved. In an embodiment of the present disclosure, the folding portion PLT-F may be omitted as needed or desired. In this case, the support member PLT includes the first support portion PLT-1 and the second support portion PLT-2 that are spaced apart from each other.

The support member PLT may include (e.g., may be selected from) one or more suitable materials capable of transmitting an electromagnetic field generated by the digitizer DTM, which will be described in more detail below, without loss or with minimal or reduced loss. For example, the support member PLT may include a non-metal material. The support member PLT may include a reinforcing fiber composite material. The support member PLT may include reinforcing fibers disposed inside a matrix part. The reinforcing fibers may be carbon fibers or glass fibers. The matrix part may include a polymer resin. The matrix part may include a thermoplastic resin. For example, the matrix part may include a polyamide-based resin or a polypropylene-based resin. For example, the reinforced fiber composite may be carbon fiber reinforced plastic (CFRP) or glass fiber reinforced plastic (GFRP).

Referring to FIGS. 5C and 5D, in some embodiments, the support member PLT includes at least the first support portion PLT-1 corresponding to the first non-folding area NFA10, and the second support portion PLT-2 corresponding to the second non-folding area NFA20. The support member PLT may include the folding portion PLT-F, which corresponds to the folding area FAO, that is disposed between the first support portion PLT-1 and the second support portion PLT-2, and defines the plurality of openings OP. The first supporting portion PLT-1, the second supporting portion PLT-2, and the folding portion PLT-F may have an integral shape.

As described above with reference to FIGS. 1A to 1C, as the electronic device ED changes from a first mode to a second mode, the shape of the folding portion PLT-F changes, but the shape of the first support portion PLT-1 and the shape of the second support portion PLT-2 are not changed. Each of the first support portion PLT-1 and the second support portion PLT-2 provides a flat or substantially flat support surface, irrespective of the operation mode. The first support portion PLT-1 and the second support portion PLT-2 may be defined as a first area that does not change in shape depending on the change in the operation mode of the electronic device ED. The folding portion PLT-F may be defined as a second area having a shape that changes depending on the change in the operation mode of the electronic device ED.

As illustrated in FIG. 5D, the plurality of openings OP may be suitably arranged, such that the folding area FAO has a lattice shape on a plane (e.g., in a plan view). Flexibility of the folding portion PLT-F may be improved by the plurality of openings OP. The folding portion PLT-F may prevent or substantially prevent foreign substances from penetrating into the central area of the barrier layer BRL that is opened (e.g., that is exposed) from the first support portion PLT-1 and the second support portion PLT-2 during the folding operation illustrated in FIGS. 1B and 1C.

Referring to FIG. 5D, the plurality of openings OP are defined in the folding portion PLT-F. An area excluding the plurality of openings OP is defined as a support area. The support area may include first extension portions F-C and second extension portions F-L. Each of the first extension portions F-C extends in the first direction DR1, and the first extension portions F-C are arranged along the second direction DR2. Each of the second extension portions F-L extends in the second direction DR2, and is disposed between adjacent first extension portions F-C. The first extension portions F-C and the second extension portions F-L may define a grid shape. The first extension portions F-C may be suitably disposed, such that the plurality of openings OP have a zigzag arrangement in the second direction.

Referring again to FIG. 5A, the cover layer SCV and the digitizer DTM are disposed under the support member PLT. The cover layer SCV is disposed to overlap with the folding area FAO. The digitizer DTM may include the first digitizer DTM-1 and the second digitizer DTM-2 overlapping with the first support portion PLT-1 and the second support portion PLT-2, respectively. A portion of each of the first digitizer DTM-1 and the second digitizer DTM-2 may be disposed under the cover layer SCV.

The seventh adhesive layer AL7 couples (e.g., connects or attaches) the support member PLT and the digitizer DTM to each other, and the eighth adhesive layer AL8 couples (e.g., connects or attaches) the cover layer SCV and the support member PLT to each other. The seventh adhesive layer AL7 may include a first portion AL7-1 coupling (e.g., connecting or attaching) the first support part PLT-1 and the first digitizer DTM-1 to each other, and a second portion AL7-2 coupling (e.g., connecting or attaching) the second support part PLT-2 and the second digitizer DTM-2 to each other.

The cover layer SCV may be disposed between the first portion AL7-1 and the second portion AL7-2 of the seventh adhesive layer AL7 in the second direction DR2. The cover layer SCV may be spaced apart from the digitizer DTM to prevent or substantially prevent interference with the digitizer DTM in the unfolded state. A sum of thicknesses of the cover layer SCV and the eighth adhesive layer AL8 may be smaller than a thickness of the seventh adhesive layer AL7.

The cover layer SCV may cover the openings OP of the folding portion PLT-F. The cover layer SCV may have a lower elastic modulus than that of the support member PLT. For example, the cover layer SCV may include, but is not limited to, thermoplastic polyurethane, rubber, or silicone.

The digitizer DTM, also referred to as an EMR sensing panel, includes a plurality of loop coils that generate a magnetic field of a suitable resonant frequency (e.g., a predetermined or preset resonant frequency) with an electronic pen. The magnetic field formed in the loop coil is applied to an LC resonance circuit composed of an inductor (coil) and a capacitor of the electronic pen. The coil generates a current by the received magnetic field, and transfers the generated current to the capacitor. Accordingly, the capacitor charges the current input from the coil, and discharges the charged current to the coil. As a result, the magnetic field of the resonant frequency is emitted to the coil. The magnetic field emitted by the electronic pen may be absorbed again by the loop coil of the digitizer, and accordingly, it may be possible to determine where the electronic pen is located adjacent to a touch screen.

The first digitizer DTM-1 and the second digitizer DTM-2 are spaced apart from each other with the gap GP. A width of the gap GP may be about 0.3 mm to about 3 mm, and the gap GP may be disposed to correspond to the folding area FAO.

The metal layer ML is disposed under the digitizer DTM. The metal layer ML may include a first metal layer ML1 and a second metal layer ML2 overlapping with the first support portion PLT-1 and the second support portion PLT-2, respectively. The metal layer ML may radiate heat to the outside that is generated when the digitizer DTM is driven. The metal layer ML transfers the heat generated by the digitizer DTM to a lower side. The metal layer ML may have greater electrical conductivity and thermal conductivity than those of a metal plate described in more detail below. The metal layer ML may include copper or aluminum.

The ninth adhesive layer AL9 couples (e.g., connects or attaches) the digitizer DTM and the metal layer ML to each other. The ninth adhesive layer AL9 may include a first portion AL9-1 and a second portion AL9-2 corresponding to the first metal layer ML1 and the second metal layer ML2, respectively.

The metal plate MP is disposed under the metal layer ML. The metal plate MP may include a first metal plate MP1 and a second metal plate MP2 overlapping with the first metal layer ML1 and the second metal layer ML2, respectively. The metal plate MP may absorb an external shock applied from the lower side.

The metal plate MP may have a greater strength and a greater thickness than those of the metal layer ML. The metal plate MP may include a metal material, such as stainless steel.

The tenth adhesive layer AL10 couples (e.g., connects or attaches) the metal layer ML and the metal plate MP to each other. The tenth adhesive layer AL10 may include a first portion AL10-1 and a second portion AL10-2 corresponding to the first metal plate MP1 and the second metal plate MP2, respectively.

The heat dissipation layer HRP1 and HRP2 may be disposed under the metal plate MP. The heat dissipation layer HRP1 and HRP2 may include a first heat dissipation layer HRP1 and a second heat dissipation layer HRP2 overlapping with the first metal plate MP1 and the second metal plate MP2, respectively. The heat dissipation layer HRP1 and HRP2 radiates heat generated from electronic components disposed below. The electronic components may be the electronic module EM shown in FIGS. 2A and 2B. The heat dissipation layer HRP1 and HRP2 may have a structure in which an adhesive layer and a graphite layer are alternately stacked. An outermost adhesive layer may be attached to the metal plate MP.

A magnetic field shielding sheet MSM is disposed under the metal plate MP. The magnetic field shielding sheet MSM shields a magnetic field generated by a magnetic material disposed on the lower side. The magnetic field shielding sheet MSM may prevent or substantially prevent the magnetic field generated from the magnetic material from interfering with the digitizer DTM.

The magnetic field shielding sheet MSM includes a plurality of portions. At least some of the plurality of portions may have different thicknesses from one another. The plurality of portions may be disposed to fit to a step difference of a bracket disposed below (e.g., underneath) the display device DD. The magnetic shielding sheet MSM may have a structure in which a magnetic shielding layer and an adhesive layer are alternately stacked. A portion of the magnetic field shielding sheet MSM may be directly attached to the metal plate MP, and a portion of the magnetic field shielding sheet MSM may be directly attached to the metal plate MP.

A through-hole LTH may be formed in some members of the lower member LM. The through-hole LTH is disposed to overlap with the sensing area DP-TA illustrated in FIG. 2A. As illustrated in FIG. 5A, the through-hole LTH may penetrate from the fifth adhesive layer AL5 to the metal plate MP. The through-hole LTH may be formed by removing the light blocking structure from a path of an optical signal, and the through-hole LTH may improve an optical signal reception efficiency of the electro-optical module ELM.

Figure 6:
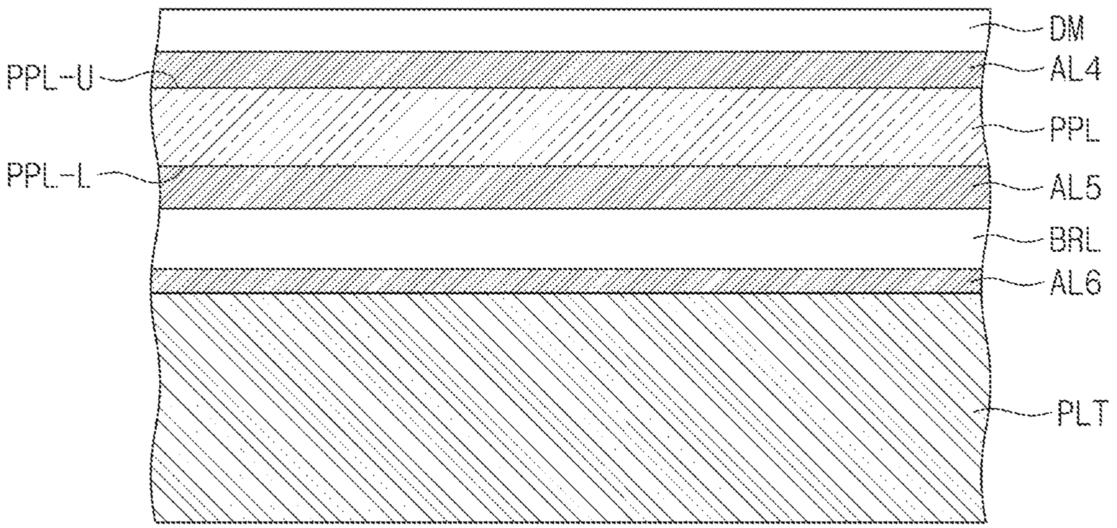
FIG. 6 is a cross-sectional view illustrating a partial configuration of a display device according to an embodiment of the present disclosure.
Figure 7A:
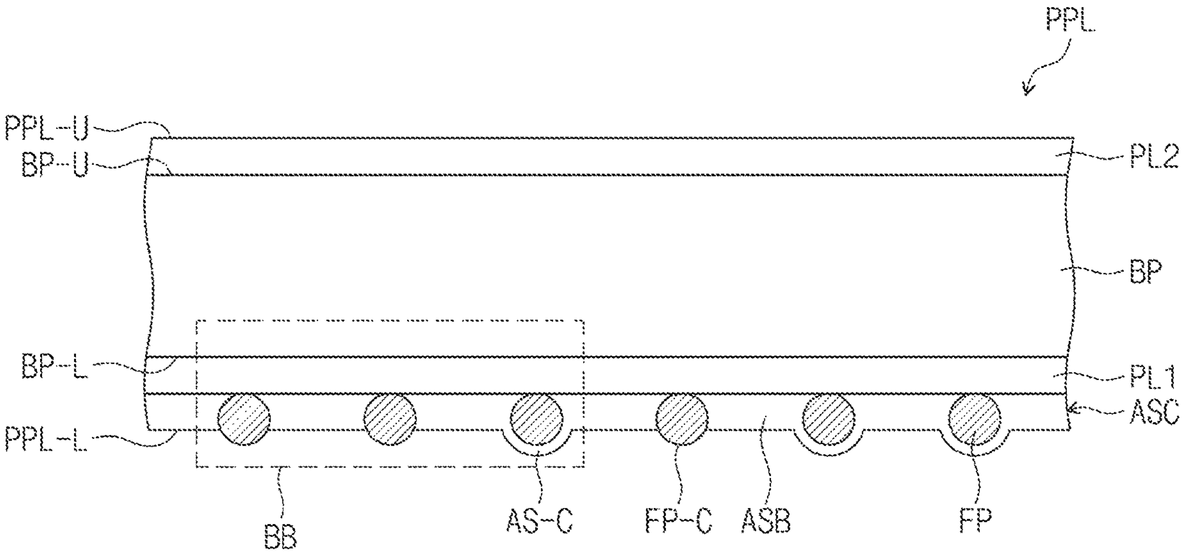
FIG. 7A is a cross-sectional view of a protective film according to an embodiment of the present disclosure.
Figure 7B:
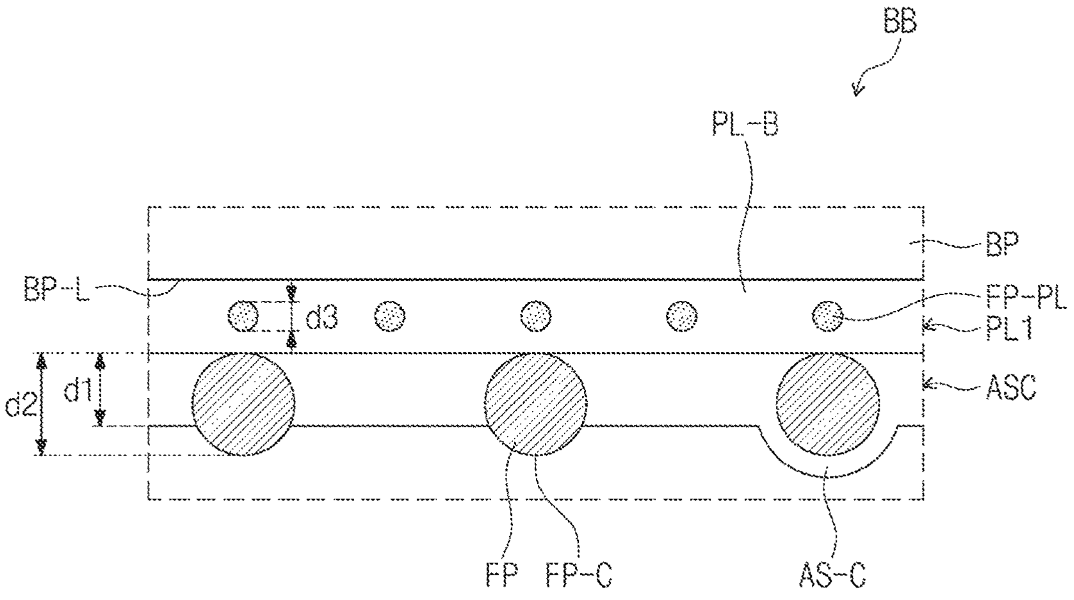
FIG. 7B is a cross-sectional view illustrating a partial configuration of a protective film according to an embodiment of the present disclosure.

FIG. 6 is a cross-sectional view illustrating a partial configuration of a display device according to an embodiment of the present disclosure. FIG. 7A is a cross-sectional view of a protective film according to an embodiment of the present disclosure. FIG. 7B is a cross-sectional view illustrating a partial configuration of a protective film according to an embodiment of the present disclosure. FIG. 7B is an enlarged view of the components shown in the region BB of FIG. 7A.

Referring to FIGS. 5A and 6, in the display device DD according to an embodiment, the protective film PPL is disposed under the display module DM, and the support member PLT is disposed under the protective film PPL. The fourth adhesive layer AL4 (e.g., the upper adhesive layer) may be disposed between the display module DM and the protective film PPL. The barrier layer BRL may be disposed between the protective film PPL and the support member PLT. The fifth adhesive layer AL5 may be disposed between the protective film PPL and the barrier layer BRL, and the sixth adhesive layer AL6 may be disposed between the barrier layer BRL and the support member PLT. The protective film PPL may include an upper surface PPL-U adjacent to the display module DM, and a lower surface PPL-L adjacent to the support member PLT.

Referring to FIGS. 6, 7A, and 7B, the protective film PPL includes a base layer BP, and an antistatic coating layer ASC disposed on one surface of the base layer BP.

The base layer BP may provide a base surface of the protective film PPL, and may have a suitable rigidity (e.g., a predetermined rigidity) to protect a lower portion of the display module DM that is disposed on the protective film PPL. The base layer BP may include, for example, a flexible synthetic resin film. The flexible synthetic resin film included in the base layer BP may be a heat-resistant synthetic resin film. The base layer BP may include, for example, heat-resistant polyethylene terephthalate. However, the present disclosure is not limited thereto, and the base layer BP may include a heat-resistant synthetic resin material, such as polyamideimide, polyetheretherketone, or polyphenylene sulfide. The base layer BP may be a single material layer in which other materials are not included. A thickness of the base layer BP may be about 30 micrometers to about 70 micrometers. The thickness of the base layer BP may be, for example, 50 micrometers.

The base layer BP may include an upper surface BP-U corresponding to the upper surface PPL-U of the protective film PPL, and a lower surface BP-L corresponding to the lower surface PPL-L of the protective film PPL. The antistatic coating layer ASC may be disposed on the lower surface BP-L of the base layer BP. In other words, the antistatic coating layer ASC may be disposed on the lower surface BP-L, which is a surface adjacent to the support member PLT, of the base layer BP.

The protective film PPL may further include intermediate layers PL1 and PL2 disposed on at least one surface of the base layer BP. The intermediate layers PL1 and PL2 may be disposed on at least one of the upper surface BP-U or the lower surface BP-L of the base layer BP. The protective film PPL may include a first intermediate layer PL1 disposed on the lower surface BP-L of the base layer BP, and a second intermediate layer PL2 disposed on the upper surface BP-U of the base layer BP. The first intermediate layer PL1 may be disposed between the base layer BP and the antistatic coating layer ASC. The first intermediate layer PL1 may be in contact with each of the lower surface BP-L of the base layer BP and the upper surface of the antistatic coating layer ASC. The second intermediate layer PL2 may be disposed between the base layer BP and the fourth adhesive layer AL4. The second intermediate layer PL2 may be in contact with each of the upper surface BP-U of the base layer BP and the fourth adhesive layer AL4. An upper surface of the second intermediate layer PL2 may define the upper surface PPL-U of the protective film PPL. The intermediate layers PL1 and PL2 may be a layer for improving adhesion between adjacent components, and protecting the base layer BP. In addition, the intermediate layers PL1 and PL2 may include additional filling particles FP-PL to reduce a haze caused by external light. In an embodiment, the intermediate layers PL1 and PL2 may be omitted as needed or desired. For example, at least one of the first intermediate layer PL1 or the second intermediate layer PL2 may be omitted as needed or desired. When the first intermediate layer PL1 is omitted, the antistatic coating layer ASC may be directly disposed on the lower surface BP-L of the base layer BP. When the second intermediate layer PL2 is omitted, the upper surface BP-U of the base layer BP may define the upper surface PPL-U of the protective film PPL, and the fourth adhesive layer AL4 may be disposed directly on the upper surface BP-U of the base layer BP.

The antistatic coating layer ASC includes a coating base material layer ASB, and a plurality of fillers FP dispersed in the coating base material layer ASB. The filler FP may include a spherical particle.

The coating base material layer ASB may be a layer that provides a base material in which the plurality of fillers FP are dispersed, and provides the protective film PPL to have antistatic properties. The coating base material layer ASB may include one of a conductive polymer. In an embodiment, the coating base material layer ASB may include polyacetylene, polypyrrole, and/or polythiophene. The coating base material layer ASB may include poly(3,4-ethylene dioxythiophene) (PEDOT), polyaniline, or poly(3,4-ethylenedioxythiophene):poly(styrenesulfonate) (PEDOT:PSS).

A thickness d1 of the coating base material layer ASB may be about 0.3 micrometers or more, and about 1 micrometer or less. The thickness d1 of the coating base material layer ASB may be, for example, about 0.6 micrometers or more, and about 1 micrometer or less. When the thickness d1 of the coating base material layer ASB is less than 0.3 micrometers, the antistatic properties of the protective film PPL may be lowered, and optical properties may be deteriorated. When the thickness d1 of the coating base material layer ASB is greater than 1 micrometer, a surface friction coefficient of the antistatic coating layer ASC may increase, and foreign matter defects may occur.

FIG. 7A illustrates an example in which the filler FP included in the antistatic coating layer ASC includes a plurality of spherical particles having the same or substantially the same diameter as each other, but the present disclosure is not limited thereto. The plurality of particles included in the filler FP may have a substantially monodisperse size distribution or a polydisperse distribution obtained by mixing a plurality of particles having a monodisperse distribution. The distribution of particles included in the filler FP, or in other words, the distribution of the diameters of the fillers FP, may have a normal distribution.

In the antistatic coating layer ASC according to an embodiment, an average diameter d2 of the filler FP may be greater than the thickness d1 of the coating base material layer ASB. In other words, the spherical particles included in the filler FP may have the average diameter d2 greater than the thickness d1 of the coating base material layer ASB that is stacked. Accordingly, at least a portion of the filler FP may be exposed to protrude from a surface of the coating base material layer ASB. In other words, the at least the portion of the filler FP may include an exposed surface FP-C that is exposed toward the support member PLT and the barrier layer BRL disposed below (e.g., thereunder). On the other hand, some of the fillers FP may have the exposed surface FP-C that is not covered with the coating base material layer ASB, and others of the fillers FP may not be exposed, and thus, may be covered by a cover part AS-C of the coating base material layer ASB. Some of the fillers FP including the exposed surface FP-C and the others of the fillers FP covered by the cover part AS-C may be randomly arranged.

An average size of the plurality of particles included in the filler FP may be about 1.5 micrometers or more, and about 3 micrometers or less. The average size of the plurality of particles included in the filler FP may indicate an average diameter of the plurality of particles included in the filler FP. The average diameter d2 of the filler FP may be about 1.5 micrometers or more, and about 3 micrometers or less. In an embodiment, the average diameter d2 of the filler FP may be about 2 micrometers or more, and about 2.5 micrometers or less. When the average diameter d2 of the filler FP is less than 1.5 micrometers, transmittance and surface quality of the protective film PPL may be lowered, a haze due to external light may increase, and optical properties may be reduced. When the average diameter d2 of the filler FP is more than 3 micrometers, a surface friction coefficient of the antistatic coating layer ASC may be increased, slip properties may be reduced, and a foreign substance defect may occur.

As described above, the diameter distribution of the filler FP may have a normal distribution. The maximum diameter of the filler FP may be less than 10 micrometers. The maximum diameter of the filler FP may refer to a diameter of a particle having a maximum size from among the plurality of particles included in the filler FP. In other words, the plurality of particles included in the filler FP may all have a size of about 10 micrometers or less.

The filler FP may include a thermoplastic polymer as a base material. The filler FP may include, for example, at least one selected from the group consisting of polyethylene, polypropylene, and polystyrene. The filler FP may include polystyrene as a base material.

The filler FP may further include an acryl-based monomer to strengthen a coupling (e.g., connecting or attaching) force with the coating base material layer ASB. In an embodiment, the filler FP may include a material in which an acrylic monomer is added to polystyrene, which is a base material. The filler FP may further include a silicone-acrylic monomer. The filler FP may further include a silicone-acrylic copolymer.

In the antistatic coating layer ASC according to an embodiment, the filler FP may have a content of 1 wt % or less based on the total material included in the antistatic coating layer ASC. The filler FP may have a content of 0.1 wt % or more, and 1 wt % or less based on the total material included in the antistatic coating layer ASC. When the filler FP is included in less than 0.1 wt % based on the total material included in the antistatic coating layer ASC, an effect of reducing the friction coefficient by the filler FP may be decreased, and the surface friction coefficient of the antistatic coating layer ASC may increase. When the filler FP is included in an amount of more than 1 wt % based on the total material included in the antistatic coating layer ASC, the antistatic properties of the protective film PPL may be lowered, and optical properties may be deteriorated.

In the protective film PPL including the antistatic coating layer ASC according to an embodiment, a lower surface of the antistatic coating layer ASC may define the lower surface PPL-L of the protective film PPL. An area ratio of a portion where the filler FP is disposed may be 1% or less with respect to the entire lower surface of the antistatic coating layer ASC. The area ratio of a portion where the filler FP is disposed may be 0.1% or more, and 1% or less with respect to the entire lower surface of the antistatic coating layer ASC. When the area ratio of a portion where the filler FP is disposed is less than 0.1%, the friction coefficient by the filler FP may be reduced, and the surface friction coefficient of the antistatic coating layer ASC may be increased. When the area ratio of a portion where the filler FP is disposed is more than 1%, the antistatic properties of the protective film PPL may be lowered, and optical properties may be deteriorated.

In the protective film PPL including the antistatic coating layer ASC according to an embodiment, the lower surface of the antistatic coating layer ASC may define the lower surface PPL-L of the protective film PPL, and the lower surface of the antistatic coating layer ASC may have a low friction coefficient. In more detail, the lower surface of the antistatic coating layer ASC may have a friction coefficient of 1 or less. The friction coefficient of the lower surface of the antistatic coating layer ASC may be defined as a magnitude of a force measured when the lower surfaces of the antistatic coating layer ASC slide in contact with each other in the two protective films PPL. The lower surface of the antistatic coating layer ASC may have a friction coefficient of 1 or less, and thus, may have excellent slip properties.

As described above, the protective film PPL may further include the first intermediate layer PL1 disposed between the base layer BP and the antistatic coating layer ASC, and the first intermediate layer PL1 may include the additional filling particles FP-PL. The additional filling particles FP-PL may be dispersed in an intermediate base material layer PL-B. The first intermediate layer PL1 may include the additional filling particles FP-PL to reduce a haze caused by external light passing through the protective film PPL. Although FIG. 7B shows an example in which the additional filling particles FP-PL are included in the first intermediate layer PL1, the second intermediate layer PL2 may include additional filling particles FP-PL dispersed in an intermediate base material layer PL-B, similar to that of the first intermediate layer PL1.

The additional filling particles FP-PL may include a plurality of spherical particles that are different from those of the filler FP included in the antistatic coating layer ASC. The additional filling particles FP-PL may include a material different from that of the filler FP. The additional filling particles FP-PL may include, for example, a polymerizable oligomer.

An average diameter d3 of the additional filling particles FP-PL may be smaller than the average diameter d2 of the fillers FP. In other words, the size of the plurality of spherical particles included in the additional filling particles FP-PL may be smaller than the average size of the plurality of particles included in the fillers FP.

The electronic device according to an embodiment may include the antistatic coating layer under the protective film disposed under the display panel to include the antistatic properties. The antistatic coating layer includes the plurality of fillers, and the surface of the antistatic coating layer has the low friction coefficient without deteriorating the optical properties of the protective film. Accordingly, a defect in which a foreign substance is attached to the surface of the antistatic coating layer in an intermediate stage of a process may be prevented or substantially prevented, and thus, manufacturing yield and reliability of the electronic device may be improved.

Unlike the electronic device according to an embodiment, when the antistatic coating layer disposed under the protective film under the display panel does not include the filler, the surface of the antistatic coating layer may have a high friction coefficient. In more detail, when no filler is included in the antistatic coating layer, there may be no portion derived from the surface of the coating layer, and thus, slip properties may be lowered, and the antistatic coating layer may have a high friction coefficient of 2.5 or more. As the lower surface of the protective film is the surface exposed for a long time in the intermediate stage of the manufacturing process of the electronic device, when the slip properties of the surface of the coating layer is poor, foreign substances generated in the intermediate stage of the process may easily attach to the surface of the coating layer, and may not easily fall off after being attached thereto. In the electronic device according to one or more embodiments of the present disclosure, the antistatic coating layer may include the plurality of fillers having the average diameter greater than the thickness of the coating base material layer, to allow the filling particles to have an irregularly protruding shape from the lower surface of the coating layer, and thus, may have the low friction coefficient, and the slip properties of the surface may be improved. Accordingly, the defect in which the foreign substances are attached to the surface of the antistatic coating layer in the intermediate stage of the process may be prevented or substantially prevented, and thus, the manufacturing yield and reliability of the electronic device may be improved.

Figure 8A:
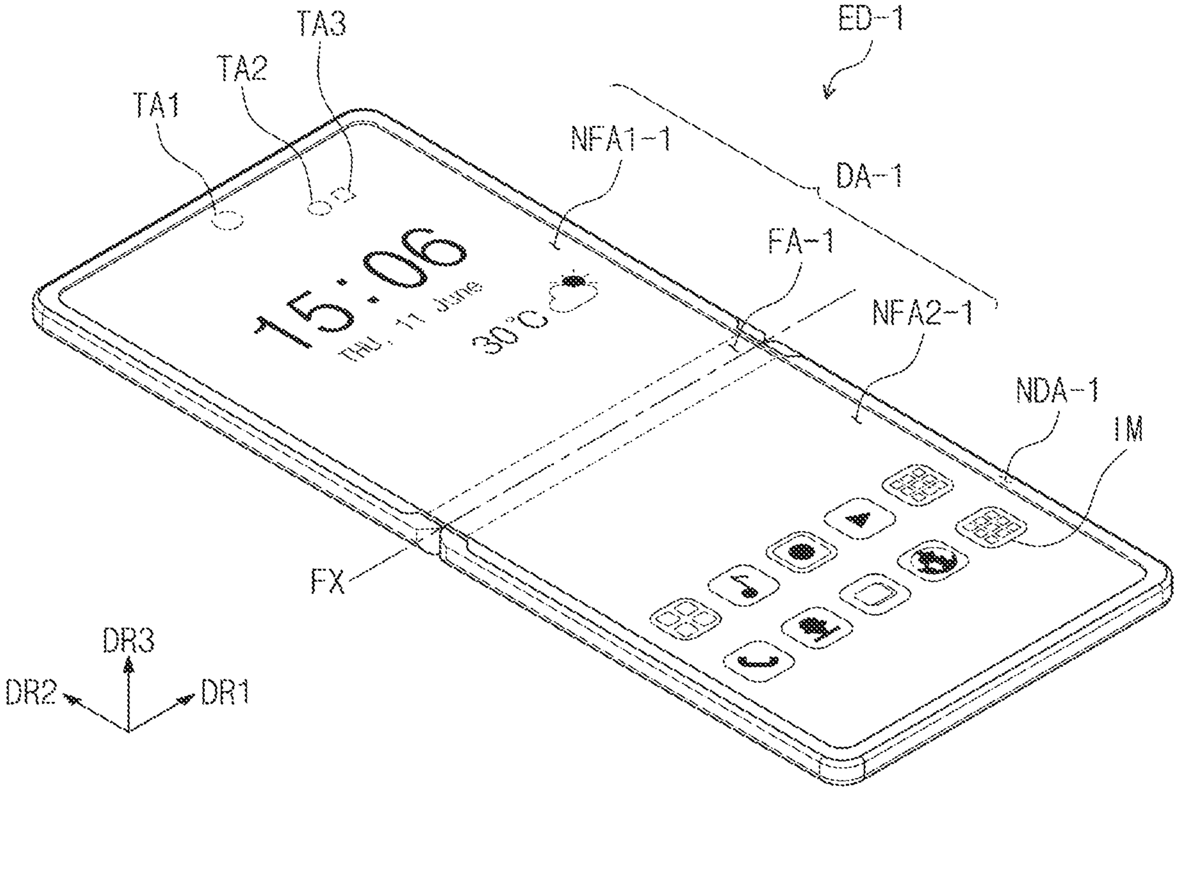
FIGS. 8A and 8B are perspective views of an electronic device according to an embodiment of the present disclosure.
Figure 8B:
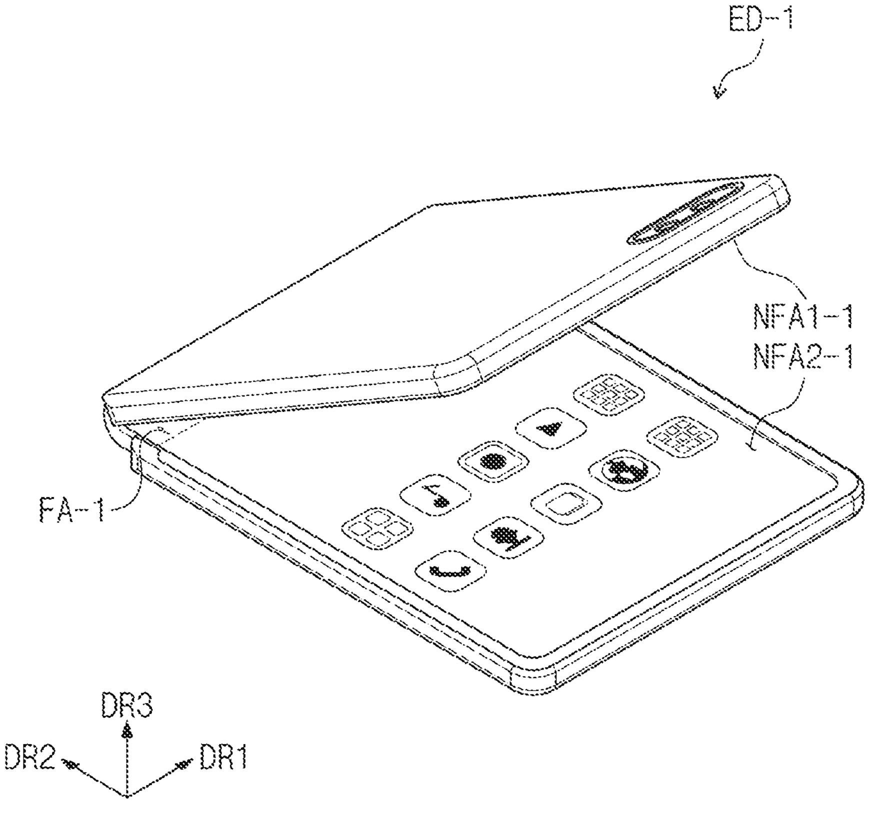

FIGS. 8A and 8B are perspective views of an electronic device according to an embodiment of the present disclosure. FIG. 8A shows an electronic device ED-1 in an unfolded state, and FIG. 8B shows the electronic device ED-1 in a folded state. FIGS. 8A and 8B illustrate the electronic device ED-1 according to an embodiment in which a folding axis FX is parallel to or substantially parallel to a minor axis direction of the electronic device ED-1, unlike that of the electronic device ED according to one or more embodiments of the present disclosure described above with reference to FIGS. 1A to 1C.

The electronic device ED-1 according to an embodiment may display an image through a display area DA-1. In an unfolded state of the electronic device ED-1, the display area DA-1 may include a plane defined by the first direction DR1 and the second direction DR2. A thickness direction of the electronic device ED-1 may be parallel to or substantially parallel to the third direction DR3 crossing (e.g., intersecting) the first and second directions DR1 and DR2. Accordingly, a front surface (e.g., an upper surface) and a rear surface (e.g., a lower surface) of each of the members and layers constituting the electronic device ED-1 may be defined based on the third direction DR3. The electronic device ED-1 may have a short axis extending in the first direction DR1, and a long axis extending in the second direction DR2.

The display area DA-1 may include a first non-folding area NFA1-1, a folding area FA-1, and a second non-folding area NFA2-1. The folding area FA-1 may be bent based on the folding axis FX extending in the first direction DR1.

When the electronic device ED-1 is folded, the first non-folding area NFA1-1 and the second non-folding area NFA2-1 may be in-folded to face each other. Accordingly, in the fully folded state, the display area DA-1 may not be exposed to the outside. However, the present disclosure is not limited thereto, and when the electronic device ED-1 is folded, the first non-folding area NFA1-1 and the second non-folding area NFA2-1 may be out-folded to be opposite to each other.

The electronic device ED-1 may perform one of the in-folding operation or the out-folding operation. As another example, the electronic device ED-1 may perform both the in-folding operation and the out-folding operation. In this case, the same portion of the electronic device ED-1, for example, such as the folding area FA-1, may be folded in the in-folded and the out-folded operations. As another example, a partial portion of the electronic device ED-1 may be in-folded, and another partial portion thereof may be out-folded.

Although one folding area and two non-folding areas are illustrated in FIGS. 8A and 8B, the numbers of folding areas and non-folding areas are not limited thereto. For example, the electronic device ED-1 may include more than two non-folding areas, and a plurality of folding areas disposed between adjacent ones of the non-folding areas.

A plurality of sensing areas TA1, TA2, and TA3 may be defined in the electronic device ED-1. Although three sensing areas TA1, TA2, and TA3 are illustrated in FIG. 8A, the number of the plurality of sensing areas TA1, TA2 and TA3 is not limited thereto.

The plurality of sensing areas TA1, TA2, and TA3 may include a first sensing area TA1, a second sensing area TA2, and a third sensing area TA3. For example, the first sensing area TA1 may overlap with a camera module (e.g., a camera), and the second sensing area TA2 and the third sensing area TA3 may overlap with a proximity illuminance sensor, but the present disclosure is not limited thereto.

Each of a plurality of electro-optic modules ELM (e.g., see FIG. 2A) may receive an external input transmitted through the first sensing area TA1, the second sensing area TA2, or the third sensing area TA3, or may provide an output through the first sensing area TA1, the second sensing area TA2, or the third sensing area TA3.

The first sensing area TA1, the second sensing area TA2, and the third sensing area TA3 may be included at (e.g., in or on) the display area DA-1. In other words, the first sensing area TA1, the second sensing area TA2, and the third sensing area TA3 may display an image. A transmittance of each of the first sensing area TA1, the second sensing area TA2, and the third sensing area TA3 may be higher than that of the display area DA-1. Also, the transmittance of the first sensing area TA1 may be higher than each of the transmittance of the second sensing area TA2 and the transmittance of the third sensing area TA3. However, the present disclosure is not limited thereto, and at least one of the first sensing area TA1, the second sensing area TA2, or the third sensing area TA3 may not be provided at (e.g., in or on) the display area DA-1, and may be provided at (e.g., in or on) the non-display area NDA-1. An opening may be provided in at least one of the first sensing area TA1, the second sensing area TA2, or the third sensing area TA3.

According to an embodiment of the present disclosure, some of the plurality of electronic modules may overlap with the display area DA-1, and other portions of the plurality of electronic modules may be surrounded (e.g., around peripheries thereof) by the display area DA-1. Accordingly, it is not necessary to provide an area in which the plurality of electronic modules are to be disposed in the non-display area NDA-1 around the display area DA-1. As a result, an area ratio of the display area DA-1 with respect to a front surface of the electronic device ED-1 may be increased.

According to one or more embodiments of the present disclosure, the surface friction coefficient of the antistatic coating layer disposed on the lower surface of the protective film under the display panel may be reduced to improve slip properties, and thus, defects in which foreign substances are attached to the surface of the antistatic coating layer in an intermediate stage of a process may be prevented or substantially prevented. Accordingly, the manufacturing yield and reliability of the electronic device may be improved.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An electronic device comprising:

a display panel comprising an organic light emitting element, a first non-folding area, a second non-folding area, and a folding area between the first non-folding area and the second non-folding area;

a protective film under the display panel; and a support member under the protective film, wherein the protective film comprises:

a base layer including an upper surface adjacent to the display panel, and a lower surface adjacent to the support member; and an antistatic coating layer on the lower surface of the base layer, and comprising a coating base material layer comprising a conductive polymer, and a plurality of fillers dispersed in the coating base material layer comprising the conductive polymer, wherein an average diameter of the plurality of fillers is greater than a thickness of the coating base material layer, wherein the protective film including the antistatic coating layer is attached between the display panel and the support member, wherein the protective film further comprises an intermediate layer on at least one of the upper surface or the lower surface of the base layer, and comprising an additional filling particle, and wherein the additional filling particle comprises a polymerizable oligomer.

2. The electronic device of claim 1, wherein the thickness of the coating base material layer is 0.3 micrometers or more, and 1 micrometer or less.

3. The electronic device of claim 1, wherein the average diameter of the plurality of fillers is 1.5 micrometers or more, and 3 micrometers or less.

4. The electronic device of claim 1, wherein each of the plurality of fillers comprises at least one selected from a group consisting of polyethylene, polypropylene, and polystyrene.

5. The electronic device of claim 4, wherein each of the plurality of fillers further comprises an acrylic monomer additive.

6. The electronic device of claim 1, wherein the base layer comprises a heat-resistant synthetic resin film.

7. The electronic device of claim 1, wherein some of the plurality of fillers comprise an exposed surface that is exposed in a direction toward the support member, and wherein others of the plurality of fillers is covered by the coating base material layer.

8. The electronic device of claim 1, wherein an area ratio of a portion of the antistatic coating layer including the plurality of fillers with respect to a total area of the antistatic coating layer in a plan view is 1% or less.

9. The electronic device of claim 1, wherein a content of the plurality of fillers with respect to a total content of the antistatic coating layer is 1 weight percentage (wt %) or less.

10. The electronic device of claim 1, wherein a friction coefficient of a lower surface of the antistatic coating layer is 1 or less.

11. The electronic device of claim 1, further comprising:

a window on the display panel;

an upper protective film between the window and the display panel; and an anti-reflection layer between the upper protective film and the display panel.

12. The electronic device of claim 1, further comprising:

a barrier layer between the protective film and the support member;

a digitizer under the support member;

a metal layer under the digitizer;

a metal plate under the metal layer; and a heat dissipation layer under the metal plate.

13. The electronic device of claim 12, wherein the support member comprises carbon fiber reinforced plastic or glass fiber reinforced plastic.

14. The electronic device of claim 12, wherein a plurality of openings overlapping with the folding area are defined in the support member.

15. The electronic device of claim 1, further comprising:

an upper adhesive layer between the display panel and the protective film; and a lower adhesive layer between the protective film and the support member.

16. An electronic device comprising:

a display panel comprising an organic light emitting element, a first non-folding area, a second non-folding area, and a folding area between the first non-folding area and the second non-folding area;

a protective film under the display panel; and a support member under the protective film, wherein the protective film comprises:

a base layer; and an antistatic coating layer on one surface of the base layer, wherein the antistatic coating layer comprises:

a coating base material layer comprising a conductive polymer; and a filler dispersed in the coating base material layer comprising the conductive polymer, wherein a thickness of the coating base material layer is 0.3 micrometers or more, and 1 micrometer or less, wherein a diameter of the filler is 1.5 micrometers or more, and 3 micrometers or less, wherein the protective film including the antistatic coating layer is attached between the display panel and the support member, wherein the protective film further comprises an intermediate layer on at least one of an upper surface or a lower surface of the base layer, and comprising an additional filling particle, and wherein the additional filling particle comprises a polymerizable oligomer.

17. The electronic device of claim 16, wherein the filler comprises:

a base material comprising at least one selected from a group consisting of polyethylene, polypropylene, and polystyrene; and an acrylic monomer.

18. An electronic device comprising:

a display device comprising a sensing area configured to pass an optical signal through, and a display area adjacent to the sensing area; and an electro-optic module below the display device, and overlapping with the sensing area, the electro-optic module being configured to receive the optical signal, wherein the display device comprises:

a window defining an upper surface of the display device;

a display panel under the window, and comprising an organic light emitting element, a first non-folding area, a second non-folding area, and a folding area between the first non-folding area and the second non-folding area; and a protective film under the display panel, wherein the protective film comprises:

a base layer including an upper surface adjacent to the display panel, and a lower surface opposite to the upper surface; and an antistatic coating layer on the lower surface of the base layer, and comprising a coating base material layer comprising a conductive polymer, and first filling particles dispersed in the coating base material layer comprising the conductive polymer, wherein a diameter of the first filling particles is greater than a thickness of the coating base material layer, wherein the protective film including the antistatic coating layer is attached under the display panel, and the protective film is not released from the display panel, wherein the protective film further comprises an intermediate layer on at least one of the upper surface or the lower surface of the base layer, and comprising an additional filling particle, and wherein the additional filling particle comprises a polymerizable oligomer.

* * * * *